(12) United States Patent
Yoo et al.

(10) Patent No.: US 11,855,342 B2
(45) Date of Patent: Dec. 26, 2023

(54) ENHANCED MIMO COMMUNICATION SYSTEMS USING RECONFIGURABLE METASURFACE ANTENNAS AND METHOD USING SAME

(71) Applicant: Duke University, Durham, NC (US)

(72) Inventors: Insang Yoo, Durham, NC (US); Seyedmohammadreza Faghih Imani, Durham, NC (US); Timothy Sleasman, Durham, NC (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 17/986,664

(22) Filed: Nov. 14, 2022

(65) Prior Publication Data
US 2023/0143134 A1 May 11, 2023

Related U.S. Application Data

(63) Continuation of application No. 17/180,536, filed on Feb. 19, 2021, now Pat. No. 11,502,396, which is a
(Continued)

(51) Int. Cl.
*H01Q 1/36* (2006.01)
*H01Q 5/30* (2015.01)
(Continued)

(52) U.S. Cl.
CPC ............. *H01Q 1/364* (2013.01); *H01Q 1/523* (2013.01); *H01Q 5/30* (2015.01);
(Continued)

(58) Field of Classification Search
CPC .......... H01Q 1/364; H01Q 1/523; H01Q 5/30; H01Q 15/0086; H01Q 21/0025;
(Continued)

(56) References Cited

U.S. PATENT DOCUMENTS 9,812,786 B2    11/2017   Foo
10,044,409 B2 *  8/2018   Barzegar ................... H04B 3/54
(Continued)

OTHER PUBLICATIONS

Yoo, et al., "Efficient complementary metamaterial element for waveguide-fed metasurface antennas," Optics Express, vol. 24, No. 25, Dec. 2016, pp. 28686-28692.
(Continued)

*Primary Examiner* — Fitwi Y Hailegiorgis
(74) *Attorney, Agent, or Firm* — POLSINELLI LLP; Kory D. Christensen

(57) ABSTRACT

A MIMO communication system is provided. The system may include a first antenna comprising a first cavity, a first plurality of RF ports for generating a feed wave within the first cavity, and a first plurality of sub-wavelength artificially structured material elements as arranged on a surface of the first cavity as RF radiators. The first antenna is configured to generate a plurality of radiation patterns respectively corresponding to the first plurality of ports. The system may also include a second antenna comprising a second cavity and a second plurality of sub-wavelength artificially structured material elements arranged on a surface of the second cavity.

20 Claims, 14 Drawing Sheets

Related U.S. Application Data continuation of application No. 16/138,783, filed on Sep. 21, 2018, now Pat. No. 10,931,004.

(60) Provisional application No. 62/561,897, filed on Sep. 22, 2017.

(51) Int. Cl.

| | |
|---|---|
| *H01Q 21/00* | (2006.01) |
| *H04B 7/0413* | (2017.01) |
| *H01Q 21/06* | (2006.01) |
| *H01Q 1/52* | (2006.01) |
| *H01Q 15/00* | (2006.01) |
| *H01Q 21/28* | (2006.01) |
| *H01Q 25/00* | (2006.01) |
| *H04B 7/06* | (2006.01) |
| *H04B 7/08* | (2006.01) |
| *H04B 7/10* | (2017.01) |

(52) U.S. Cl.
CPC ..... *H01Q 15/0086* (2013.01); *H01Q 21/0025* (2013.01); *H01Q 21/062* (2013.01); *H01Q 21/28* (2013.01); *H01Q 25/00* (2013.01); *H04B 7/0413* (2013.01); *H04B 7/0617* (2013.01); *H04B 7/0837* (2013.01); *H04B 7/10* (2013.01)

(58) Field of Classification Search
CPC ...... H01Q 21/062; H01Q 21/28; H01Q 25/00; H04B 7/0413; H04B 7/0617; H04B 7/0837; H04B 7/10
USPC ........................................................ 375/267
See application file for complete search history.

(56) References Cited

U.S. PATENT DOCUMENTS

| | | |
|---|---|---|
| 10,075,219 B1 | 9/2018 | Lipworth et al. |
| 10,200,069 B1 | 2/2019 | Urzhumov |
| 10,931,004 B2 | 2/2021 | Yoo et al. |
| 2009/0322646 A1 | 12/2009 | Dreina et al. |
| 2011/0291233 A1 | 12/2011 | Gaynor et al. |
| 2013/0076582 A1 | 3/2013 | Nysen |
| 2015/0022407 A1 | 1/2015 | Piazza et al. |
| 2015/0171514 A1 | 6/2015 | Chen et al. |
| 2015/0222021 A1 | 8/2015 | Stevenson et al. |
| 2016/0344456 A1 | 11/2016 | Prendergast et al. |
| 2017/0033462 A1 | 2/2017 | Clemente et al. |
| 2017/0346179 A1 | 11/2017 | Wu et al. |
| 2018/0316090 A1 | 11/2018 | Foo |
| 2019/0089055 A1 | 3/2019 | Amitz et al. |

OTHER PUBLICATIONS

Johnson, et al., "Sidelobe Canceling for Reconfigurable Holographic Metamaterial Antenna," IEEE Transactions on Antennas and Propagation, vol. 63, No. 4, Apr. 2015, pp. 1881-1886.
United States Patent and Trademark Office, U.S. Appl. No. 17/180,536, Office Action dated Sep. 1, 2021, 7 pages.
United States Patent and Trademark Office, U.S. Appl. No. 17/180,536, Final Office Action dated Mar. 24, 2022, 11 pages.

* cited by examiner

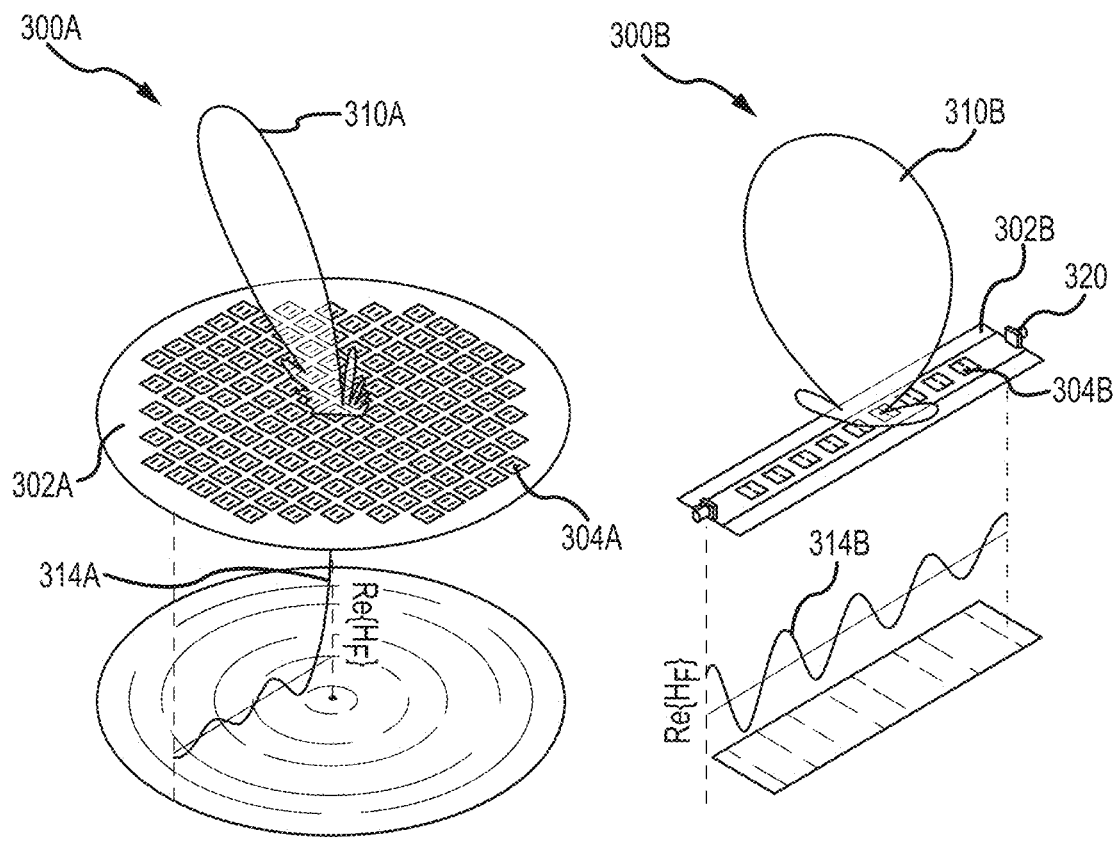
FIG.3A
FIG.3B
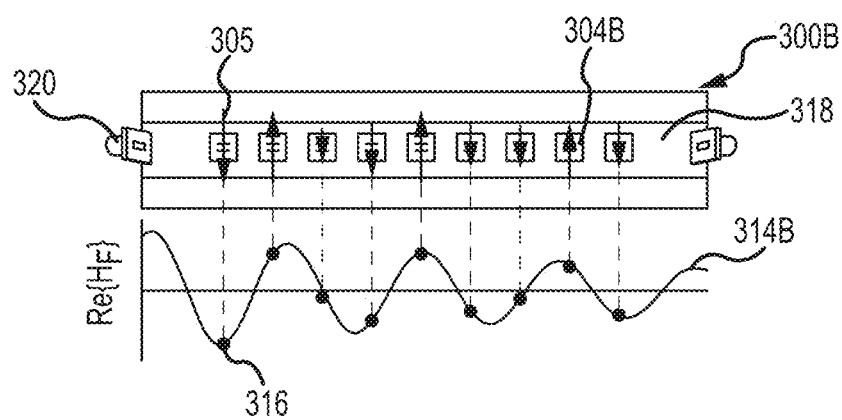
FIG.3C

ENHANCED MIMO COMMUNICATION SYSTEMS USING RECONFIGURABLE METASURFACE ANTENNAS AND METHOD USING SAME

CROSS-REFERENCE TO RELATED APPLICATIONS

This patent application is a continuation of U.S. patent application Ser. No. 17/180,536, filed Feb. 19, 2021, entitled "ENHANCED MIMO COMMUNICATION SYSTEMS USING RECONFIGURABLE METASURFACE ANTENNAS AND METHODS OF USING SAME," which is a continuation of U.S. patent application Ser. No. 16/138,783, filed Sep. 21, 2018, entitled "ENHANCED MIMO COMMUNICATION SYSTEMS USING RECONFIGURABLE METASURFACE ANTENNAS AND METHODS OF USING SAME," which claims the benefit under 35 U.S.C. § 119(e) of U.S. Patent Application Ser. No. 62/561,897, entitled "ENHANCED MIMO COMMUNICATION SYSTEMS USING RECONFIGURABLE METASURFACE ANTENNAS AND METHODS OF USING SAME," filed on Sep. 22, 2017, each of which is incorporated herein by reference in its entirety.

FIELD

This disclosure is directed to multiple-input-multiple-output (MIMO) communication systems using reconfigurable metasurface antennas for capacity enhancement.

BACKGROUND

Many commercial multiple-input multiple-output (MIMO) communication systems have adopted an array of omnidirectional antennas as a radiative platform, regardless of the channel properties.

In conventional systems, a first problem, i.e. spatial correlation, is typically approached by introducing antenna diversity techniques: increasing the spacing between array elements and/or using dual-polarized antennas. The second problem is often mitigated by electrical/mechanical tilt of antennas' radiation patterns.

These conventional approaches have several drawbacks in practical MIMO channels. One drawback is that large spacing between the array elements is required to provide sufficient diversity. In practical implementation, however, the available space is often limited by the strict size constraint of the application. The number of accessible antenna polarizations is also limited. Another drawback is that fixed, omnidirectional patterns can exhibit high spatial correlation depending on angles of arrival and cannot adapt to changes in the propagation environments. A further drawback is that omnidirectional patterns are not beneficial in achieving high signal-to-noise ratio (SNR) in such MIMO channels. An additional drawback includes electrical tilting or realizing dynamic pattern synthesis capability in conventional radiative platform requiring additional radio frequency (RF) circuitry that complicates the overall system design and significantly increases hardware and operating costs.

There remains a need for developing new systems and methods to address these shortcomings by leveraging dexterity of metasurface antennas to circumvent the problems listed above and to offer a variety of advantages from design, implementation, and operation perspectives.

BRIEF SUMMARY

MIMO Communication System

In an embodiment, a MIMO communication system is provided. The system may include a first antenna comprising a first cavity, a first plurality of RF ports for generating a feed wave within the first cavity, and a first plurality of sub-wavelength artificially structured material elements as arranged on a surface of the first cavity as RF radiators. The first antenna is configured to generate a plurality of radiation patterns respectively corresponding to the first plurality of ports. The system may also include a second antenna comprising a second cavity and a second plurality of sub-wavelength artificially structured material elements arranged on a surface of the second cavity.

In some embodiments, the first cavity may include a first front plate and a first back plate.

In some embodiments, each of the first plurality of RF ports is coupled to the first back plate.

In some embodiments, each of the first front plate and the first back plate is planar.

In some embodiments, each of the first front plate and the first back plate may include a metal. In some embodiments, the metal may include copper.

In some embodiments, the first cavity may include a dielectric material disposed between the first front plate and the first back plate.

In some embodiments, the first cavity is one of a 2D planar cavity comprising the first front plate parallel to the first back plate or a 1D waveguide comprising a tube.

In some embodiments, the second cavity may include a second front plate and a second back plate.

In some embodiments, each of the second front plate and the second back plate is planar.

In some embodiments, each of the second front plate and the second back plate may include a metal. In some embodiments, the metal may include copper.

In some embodiments, the second cavity may include a second dielectric material disposed between the second front plate and the second back plate.

In some embodiments, the second cavity is one of a 2D planar cavity comprising the second front plate parallel to the second back plate or a 1D planar cavity comprising a closed tube.

In some embodiments, the first plurality of RF ports may include a plurality of coaxial probes coupled to a plurality of radio units.

In some embodiments, the feed wave inside the first cavity excited by the first plurality of RF ports is the sum of the fields from the plurality of coaxial probes.

In some embodiments, the system may further include a first plurality of conductive pins within the first cavity.

In some embodiments, the system may further include a first plurality of conductive cylindrical posts along the surface of the first cavity.

In some embodiments, the first cavity is filled with a dielectric material.

In some embodiments, each of the plurality of radiation patterns may include a single directed beam.

In some embodiments, the system may further include an amplifier and a phase shifter coupled to each of the first plurality of RF ports.

In some embodiments, the system may further include active elements coupled to each of the first plurality of sub-wavelength artificially structured material elements for adjustment of each element.

In some embodiments, the active elements may include diodes.

In some embodiments, the diodes may include varactor diodes.

In some embodiments, the diodes may include PIN diodes.

In some embodiments, the active elements may include transistors.

In some embodiments, each of the first plurality of sub-wavelength artificially structured material elements is configured for discrete adjustment of each element.

In some embodiments, the discrete adjustment of each element may include binary adjustment between two states.

In some embodiments, the discrete adjustment of each element may include grayscale adjustment between more than two states.

In some embodiments, each of the first plurality of sub-wavelength artificially structured material elements is configured for continuous adjustment of each element.

In some embodiments, the system may further include a third antenna comprising a third cavity comprising a third front plate and a third back plate and a third plurality of sub-wavelength artificially structured material elements on the third front planar plate, wherein the third antenna is configured to receive one or more of scattered radiation patterns from one or more of the plurality of clustered regions.

In some embodiments, the second antenna is configured to receive a plurality of scattered radiation patterns from a plurality of clustered regions between the first antenna and the second antenna.

In some embodiments, the feed wave has an electric field, and wherein a maximum of the field is at one RF port, while minimum values or nodes of electric fields are situated at all other RF ports.

In some embodiments, the feed wave is one of an RF wave, a microwave frequency wave, or a mmW frequency wave. Microwave frequency wave can be X band, K band, V band, etc.

In some embodiments, the feed wave has a bandwidth ranging from 0.5 to 8.0 percent of a central operating frequency.

In some embodiments, each of the RF ports is configured to be electrically isolated from each other within the first cavity.

In some embodiments, each of the plurality of radiation patterns is superposition of all radiations from the plurality of sub-wavelength artificially structured material elements.

In some embodiments, the superposition is linear.

In some embodiments, the system may include a first plurality of radio units coupled to each of the first plurality of RF ports.

In some embodiments, each of the first plurality and second plurality of sub-wavelength artificially structured material elements may include a metamaterial element.

In some embodiments, the metamaterial elements are complementary metamaterial elements.

In some embodiments, each of the first plurality and second plurality of sub-wavelength artificially structured material elements may include a sub-wavelength patch element.

In some embodiments, each of the first antenna and the second antenna may include a metasurface antenna.

In some embodiments, the second antenna may include a second plurality of RF ports coupled to the second back plate; wherein the second antenna is configured to generate a plurality of radiation patterns.

In some embodiments, the second antenna is configured to be a transmitting metasurface.

In some embodiments, the first antenna is configured to be a receiving metasurface.

In some embodiments, each of the plurality of sub-wavelength artificially structured material elements is configured to form a magnetic dipole.

In some embodiments, wherein the first antenna has an aperture size substantially greater than a wavelength corresponding to the operating frequency, substantially greater than 10 times a wavelength corresponding to the operating frequency, substantially greater than 100 times a wavelength corresponding to the operating frequency.

In some embodiments, the spacing between the plurality of sub-wavelength artificially structured material elements less than or equal to about one-half of a wavelength corresponding to an operating frequency, one-third of the wavelength, or one-fifth, one-tenth.

In some embodiments, the plurality of sub-wavelength artificially structured material elements is randomly arranged such that the spacing between the elements vary irregularly.

In some embodiments, the first cavity may include a tunable impedance boundary.

In some embodiments, the second cavity may include a tunable impedance boundary.

In some embodiments, the system may further include a second plurality of conductive pins within the second cavity.

In some embodiments, the system may further include a second plurality of conductive cylindrical posts along the surface of the second cavity.

Transmitting Antenna

In another embodiment, a transmitting antenna is provided. The antenna may include a cavity, a plurality of RF ports for generating a feed wave within the cavity and a plurality of sub-wavelength artificially structured material elements as arranged on a surface of the first cavity as RF radiators. The antenna is configured to generate a plurality of radiation patterns respectively corresponding to the first plurality of ports.

In some embodiments, the cavity of the transmitting antenna may include a front plate and a back plate.

In some embodiments, each of the plurality of RF ports of the transmitting antenna is coupled to the back plate.

In some embodiments, each of the front plate and the back plate of the transmitting antenna is planar.

In some embodiments, each of the front plate and the back plate of the transmitting antenna may include a metal.

In some embodiments, the metal of the transmitting antenna may include copper.

In some embodiments, the cavity of the transmitting antenna is one of a 2D planar cavity comprising the front plate parallel to the back plate or a 1D waveguide comprising a tube.

In some embodiments, the plurality of RF ports of the transmitting antenna may include a plurality of coaxial probes coupled to a plurality of radio units.

In some embodiments, the feed wave inside the cavity excited by the plurality of RF ports of the transmitting antenna is the sum of the fields from the plurality of coaxial probes.

In some embodiments, the transmitting antenna may further include a plurality of conductive pins within the cavity of the transmitting antenna.

In some embodiments, the transmitting antenna may further include a plurality of conductive cylindrical posts along the surface of the cavity of the transmitting antenna.

In some embodiments, the cavity of the transmitting antenna is filled with a dielectric material.

In some embodiments, each of the plurality of radiation patterns of the transmitting antenna may include a single directed beam.

In some embodiments, the transmitting antenna may further include an amplifier and a phase shifter coupled to each of the plurality of RF ports of the transmitting antenna.

In some embodiments, the transmitting antenna may further include active elements coupled to each of the plurality of sub-wavelength artificially structured material elements for adjustment of each element of the transmitting antenna.

In some embodiments, the active elements of the transmitting antenna may include diodes.

In some embodiments, the diodes of the transmitting antenna may include varactor diodes.

In some embodiments, the diodes of the transmitting antenna may include PIN diodes.

In some embodiments, the active elements of the transmitting antenna may include transistors.

In some embodiments, each of the plurality of sub-wavelength artificially structured material elements of the transmitting antenna is configured for discrete adjustment of each element.

In some embodiments, the discrete adjustment of each element of the transmitting antenna may include binary adjustment between two states.

In some embodiments, the discrete adjustment of each element of the transmitting antenna may include grayscale adjustment between more than two states.

In some embodiments, each of the plurality of sub-wavelength artificially structured material elements of the transmitting antenna is configured for continuous adjustment of each element.

In some embodiments, the feed wave has an electric field, and wherein a maximum of the field is at one RF port, while minimum values or nodes of electric fields are situated at all other RF ports.

In some embodiments, each of the RF ports of the transmitting antenna is configured to be electrically isolated from each other within the cavity.

In some embodiments, each of the plurality of radiation patterns of the transmitting antenna is superposition of all radiations from the plurality of sub-wavelength artificially structured material elements. The superposition is linear.

In some embodiments, the transmitting antenna may further include a plurality of radio units coupled to each of the plurality of RF ports of the transmitting antenna.

In some embodiments, each of the plurality of sub-wavelength artificially structured material elements may include a metamaterial element.

In some embodiments, the metamaterial elements of the transmitting antenna are complementary metamaterial elements.

In some embodiments, each of the plurality of sub-wavelength artificially structured material elements of the transmitting antenna may include a sub-wavelength patch element.

In some embodiments, each of the plurality of sub-wavelength artificially structured material elements of the transmitting antenna is configured to form a magnetic dipole.

In some embodiments, the plurality of sub-wavelength artificially structured material elements is randomly arranged such that the spacing between the elements vary irregularly.

In some embodiments, the cavity of the transmitting antenna may include a tunable impedance boundary.

Receiving Antenna

In a further embodiment, a receiving antenna is provided. The receiving antenna may include a cavity and a plurality of sub-wavelength artificially structured material elements arranged on a surface of the cavity. The receiving antenna may also include a plurality of RF ports coupled to the cavity, where the antenna is configured to receive energy with a plurality of receive radiation patterns respectively corresponding to the plurality of ports In some embodiments, the cavity of the receiving antenna may include a front plate and a back plate.

In some embodiments, each of the front plate and the back plate of the receiving antenna is planar.

In some embodiments, each of the front plate and the back plate of the receiving antenna may include a metal.

In some embodiments, the metal of the receiving antenna may include copper.

In some embodiments, each of the plurality of sub-wavelength artificially structured material elements of the receiving antenna may include a metamaterial element.

In some embodiments, the metamaterial elements of the receiving antenna are complementary metamaterial elements.

In some embodiments, each of the plurality of sub-wavelength artificially structured material elements of the receiving antenna may include a sub-wavelength patch element.

In some embodiments, each of the plurality of sub-wavelength artificially structured material elements of the receiving antenna is configured to form a magnetic dipole.

In some embodiments, the plurality of sub-wavelength artificially structured material elements of the receiving antenna is randomly arranged such that the spacing between the elements vary irregularly.

In some embodiments, the receiving antenna may further include a plurality of conductive pins within the cavity.

In some embodiments, the receiving antenna may further include a plurality of conductive cylindrical posts along the surface of the cavity.

In some embodiments, the cavity of the receiving antenna is filled with a dielectric material.

In some embodiments, the receiving antenna may further include active elements coupled to each of the plurality of sub-wavelength artificially structured material elements for adjustment of each element.

In some embodiments, the active elements of the receiving antenna may include diodes.

In some embodiments, the diodes of the receiving antenna may include varactor diodes.

In some embodiments, the diodes of the receiving antenna may include PIN diodes.

In some embodiments, the active elements of the receiving antenna may include transistors.

In some embodiments, each of the plurality of sub-wavelength artificially structured material elements of the receiving antenna is configured for discrete adjustment of each element.

In some embodiments, the discrete adjustment of each element of the receiving antenna may include binary adjustment between two states.

In some embodiments, the discrete adjustment of each element of the receiving antenna may include grayscale adjustment between more than two states.

In some embodiments, each of the plurality of sub-wavelength artificially structured material elements of the receiving antenna is configured for continuous adjustment of each element.

In another embodiment, a method is provided for MIMO communication between a first antenna and a second antenna. The method may include generating a feed wave within a first cavity of a first antenna from a first plurality of RF ports, a first plurality of sub-wavelength artificially structured material elements as arranged on a surface of the first cavity as RF radiators.

The method may also include simultaneously forming a plurality of radiation patterns respectively corresponding to the first plurality of ports. The method may further include independently adjusting each of the plurality of metasurface elements to obtain desired radiation patterns.

In some embodiments, the method may further include forming a plurality of spatial channels from the first antenna to the second antenna to form a communication link.

In some embodiments, the step of independently adjusting may include dynamically reconfiguring each of the plurality of metasurface elements to obtain desired radiation patterns for the environment comprising a plurality of clustered regions.

In some embodiments, the rate for dynamic adjustment may be at least 0.2 MHz.

In some embodiments, the step of independently adjusting may include shifting a first resonant frequency of the first cavity.

In some embodiments, the step of independently adjusting may include tuning by adjusting an amplitude or a phase of each of the first plurality of RF ports using an amplifier or a phase shifter coupled to each of the first plurality of RF ports.

In some embodiments, the step of independently adjusting may include electronic tuning by adjusting active elements coupled to each of the sub-wavelength artificially structured material elements.

In some embodiments, the adjusting active elements is an adjusting of bias voltages of the active elements.

In some embodiments, the step of independently adjusting may include inserting a plurality of conductive pins within the first cavity.

In some embodiments, the step of independently adjusting may include adjusting the boundary impedance of the cavity.

In some embodiments, the step of independently adjusting may include placing a plurality of cylindrical posts along the boundary of the first cavity.

In some embodiments, the step of independently adjusting may include filling the first cavity with a dielectric material.

In some embodiments, the second antenna may include a second cavity and a second plurality of sub-wavelength artificially structured material elements as arranged on a surface of the second cavity.

In some embodiments, the step of independently adjusting may include shifting a second resonant frequency of the second cavity.

In some embodiments, the step of independently adjusting may include electronic tuning by adjusting active elements coupled to each of the second plurality of sub-wavelength artificially structured material elements.

In some embodiments, the adjusting active elements is an adjusting of bias voltages of the active elements.

In some embodiments, the step of independently adjusting may include inserting a plurality of conductive pins within the second cavity.

In some embodiments, the step of independently adjusting may include adjusting the boundary impedance of the second cavity.

In some embodiments, the step of independently adjusting may include placing a plurality of cylindrical posts along the boundary of the second cavity.

In some embodiments, the step of independently adjusting may include filling the second cavity with a dielectric material.

Additional embodiments and features are set forth, in part, in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which form a part of this disclosure.

BRIEF DESCRIPTION OF THE DRAWINGS

The description will be more fully understood with references to the following figures and data graphs, which are presented as various embodiments of the disclosure and should not be construed as a complete recitation of the scope of the disclosure, wherein:

FIG. 3A is a schematic of a 2D metasurface antenna in accordance with embodiments of the disclosure.

FIG. 3B is a schematic of a 1D microstrip metasurface antenna and a feed magnetic field in accordance with embodiments of the disclosure.

FIG. 3C illustrates the metamaterial elements that are modeled by the effective magnetic dipoles corresponding to the feed magnetic field in accordance with embodiments of the disclosure.

DETAILED DESCRIPTION

Figure 1:
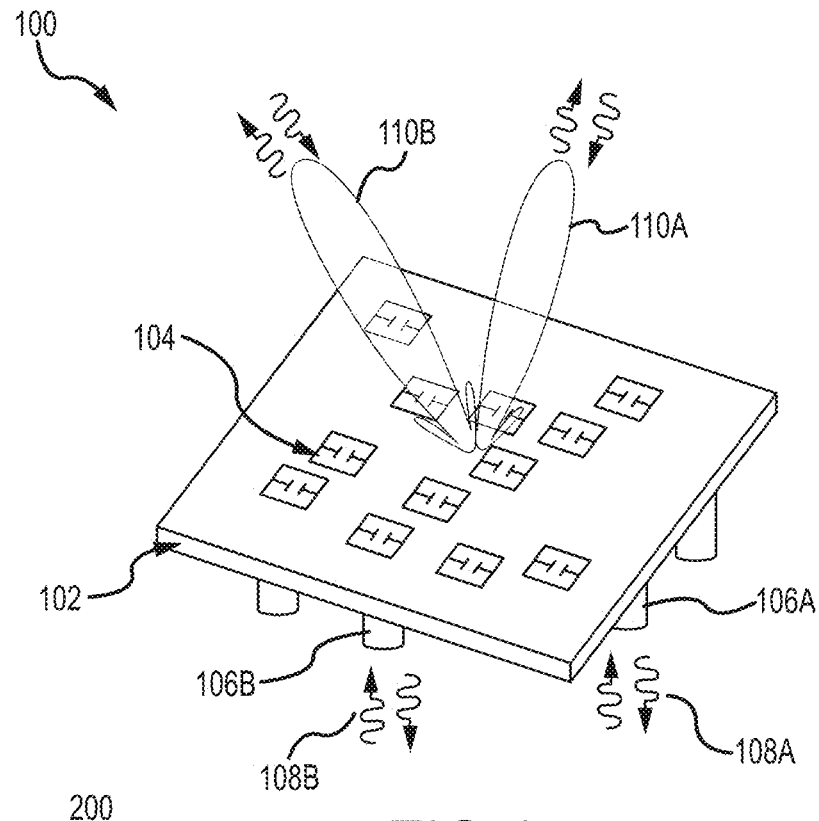
FIG. 1 is a schematic of a MIMO communication system including a cavity-backed metasurface antenna in accordance with embodiments of the disclosure.

The disclosure may be understood by reference to the following detailed description, taken in conjunction with the drawings as described below. It is noted that, for purposes of illustrative clarity, certain elements in various drawings may not be drawn to scale.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

The systems and methods provided herein are motivated, in part, by the careful examination of practical MIMO channels, where undesirable phenomena responsible for the performance degradation are often observed: (1) Significant spatial correlation due to clustering of scatterers in the propagation environments; (2) Low SNR due to the multiple scattering in the propagation environments.

One aspect of the present disclosure provides a MIMO communication system using a reconfigurable cavity-backed metasurface antenna with pattern synthesis capability to adapt to the MIMO channels for capacity enhancement. The solution is enabled by a new radiative platform and supporting algorithms and shows several advantages over the conventional systems. The key concept is to take advantage of the pattern synthesis capability of the metasurface antenna to establish MIMO channels with low spatial correlation and/or high channel gain. In this manner, the system can attain the benefits not readily available in the conventional system, while maintaining the structural simplicity of the system.

Another aspect of the present disclosure provides methods of using the systems provided herein, such as in modern cellular MIMO communication systems operating in small cell networks (such as micro cell, femto cell and pico cell) as well as wireless local area networks (WLAN) such as WiFi.

The disclosed communication system adapts its operation based on the characteristics of the MIMO channels through the metasurface aperture's pattern synthesis capabilities. In contrast to the conventional approach where complicated and costly hardware, such as phased arrays, are used to achieve the required pattern synthesis, the disclosed systems and methods described herein utilize metasurface antennas which offer comparable synthesis capabilities, but using simpler and lower cost hardware.

MIMO Communication System

FIG. 1 shows a MIMO communication system including a cavity-backed metasurface antenna in accordance with embodiments of the disclosure. While the systems and methods described herein are made with reference to one or more cavities, in various embodiments, a waveguide can be utilized instead of a cavity. The cavity-backed metasurface antenna system 100 includes a cavity 102 loaded with sub-wavelength-sized metamaterial elements 104 acting as radiators. The radiators can be either passive or tunable. These radiators may leak energy into a free space as radiation. The cavity 104 includes a radiative layer for generating radiative patterns into the free space. The overall radiation pattern is thus the superposition of the contributions from each metamaterial element or radiator.

The cavity-backed metasurface antenna system 100 also includes multiple radio frequency (RF) ports 106A-B. The cavity 104 also includes a back side coupled to multiple RF ports, such as 106A-B.

An antenna aperture or effective area is a measure of how effective an antenna is at transmitting or receiving the power of electromagnetic radiation, such as radio waves. The antenna aperture includes the radiators. The antenna aperture is excited by multiple RF ports (e.g., coaxial probes or coaxial feeds) that are designed to be electrically isolated from each other. While sharing the same aperture, the radiation patterns 110A-B per each RF port can differ. Then, each of RF ports 106A-B is connected to a separate radio unit (not shown), so that each RF port acts as a separate input (or output). Depending on MIMO communication system's configurations, the system can be used for the transmission or reception, or both transmission and reception, as shown by signals 108A-B.

The metasurface antenna system 100 can generate the desired radiation patterns by geometric tuning and/or electronic tuning of the metamaterial radiators. Thus, all possible tuning states of individual metamaterial element create a broad design space for the pattern synthesis.

In a dynamic case, the metamaterial radiators 104 can be reconfigured individually to alter the patterns at megahertz rate or higher. For example, the cavity 102 can be utilized to excite the metamaterial elements 104 due to its capability to support many modes of electromagnetic waves, which are distinct feed waves. This feeding mechanism further diversifies the electromagnetic wave impinging on each metamaterial element, augmenting the span of amplitude and phase variations (or equivalently, the design space for pattern synthesis).

Two channels, i.e. Rayleigh channels and clustered MIMO channels, may be used in the communication system. In Rayleigh channels (with uniform angle of arrivals), the metasurface antenna can be used to establish spatial channels with low correlation. As an example, a metasurface aperture can be in a reception mode in a Rayleigh channel. In such environments, the signal transmitted from a base station experiences significant scattering and the receiving aperture layer receives a set of distinct (or orthogonal) patterns. Such radiation patterns lead to low spatial correlation and can be readily created by the metasurface antenna. In this case, either of the electronic tuning or geometric tuning, or a combination of the electronic tuning and geometric tuning, can be useful in generating the radiation patterns. Once the spatial channels are established, the channel capacity is enhanced by employing the spatial multiplexing technique.

Figure 2:
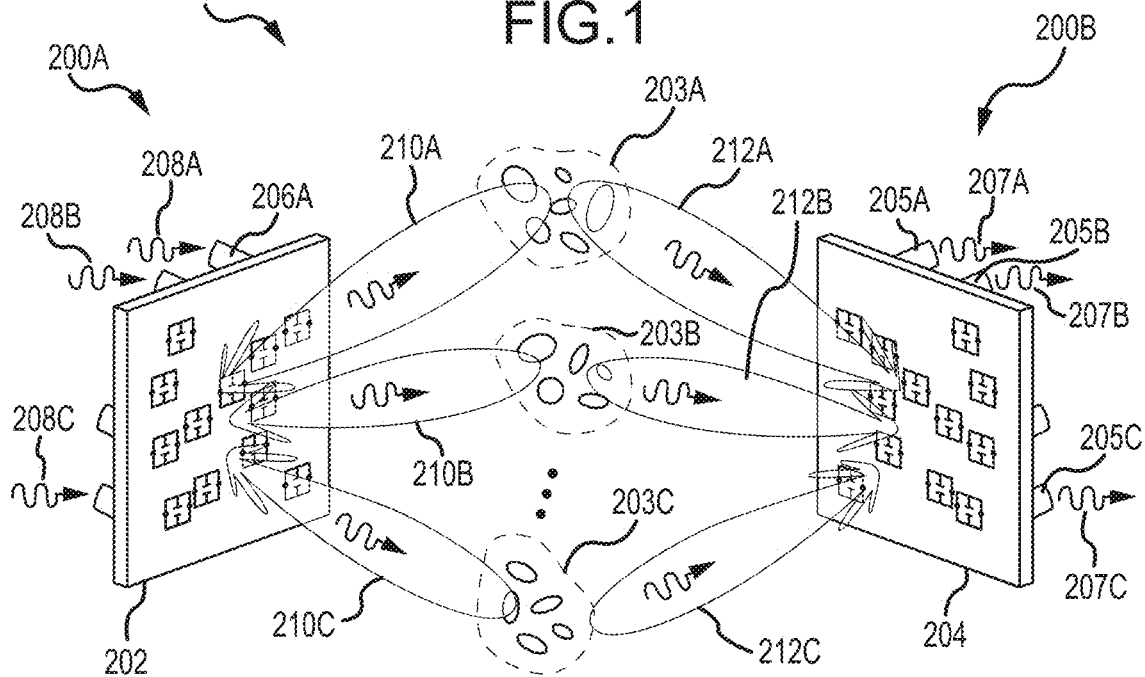
FIG. 2 is a schematic of the MIMO communication system in the clustered MIMO channels in accordance with embodiments of the disclosure.

An alternative channel model closer to real-life measurements is a clustered MIMO channel. In the clustered MIMO channel, the disclosed system can operate to establish spatial channels with low correlation and high channel gain. FIG. 2 is a schematic of a MIMO communication system in a clustered MIMO channel in accordance with embodiments of the disclosure. Transmitting and receiving metasurface antennas are used to illuminate the clusters in the propagation environments to form communication links. As shown, a reconfigurable cavity-backed metasurface antenna system 200 includes transmit and receive antennas 200A and 200B for generating a multitude of steerable beams 210A-C pointing the clusters 203A-C. The system 200 also includes multiple RF ports, e.g. RF ports 206A-C.

The antenna 200A is configured to generate multiple radiation patterns 210A-C from the respective RF ports 206A-C. The antenna 200A receives signals 208A-C from respective RF ports 206A-C as pointed by the arrows and transmits respective radiation patterns 210A-C, and acts as a transmitter. The antenna 200B receives scattered radiation patterns 212A-C, and acts as a receiver and transmits signals 207A-C out, as pointed by the arrows. In the clustered channel, the metasurface antennas can also act as both the transmitter and the receiver. For example, each of antenna 200A and antenna 200B can act both as transmitter and receiver.

The antenna apertures can generate separate, multiple beams to steer each of the clusters (clouds of scatterers in the propagation environment), which scatter the transmitted information toward the receiver to form a communication link. In the system 200, the reconfigurable cavity-backed metasurface antennas can generate a multitude of beams, such as beams 210A, 210B, and 210C and steer them toward the respective clusters 203A-C, which scatter the transmitted beams and form scattered beams 212A, 212B, and 212C toward the receiver 200B to form a communication link. In this configuration, it is should be ensured that the beams 210A-C receive most of the incoming signal power. The spatial channels comprising pairs of beams, such as beams 210A and 212A, beams 210B and 212B, and beams 210C and 212C, can be decorrelated and have high channel gain. When the beams 210A, 210B, and 210C are separated from each other and can thus focus signal energy, the spatial correlation can be mitigated, and SNR can be improved. In this manner, multiplexing gain at high SNR can be obtained.

In the communication link, each pair of beams (by the transmitting and receiving apertures) steered at the same cluster sets up a single spatial channel. Even though each of the beams 210A-C is illustrated as a single directed beam with very small side lobes, the beams 210A-C can be any radiation pattern. If the number of clusters is different from the order of MIMO communication system, the beams are used to create the channels with the number up to the order of the system.

When the cluster properties change or the user moves, the beams 210A-C can be adapted or steered by the electronic tuning of the metamaterial radiators. To do this, the MIMO communication system can recognize and characterize the clusters using automatic cluster identification algorithms. The channel capacity is boosted by employing the spatial multiplexing technique. As mentioned, these functions are implemented by the pattern synthesis capability of the reconfigurable cavity-backed metasurface antenna, which also has the advantages of being low cost, low form factor, and low-power operation. The disclosed MIMO communication system thus provides a new way to obtain this functionality. The unique architecture is well-suited to practical MIMO communication systems.

In some variations, other reconfigurable metasurfaces and metamaterials may be used for similar purposes. For example, a reconfigurable volumetric hologram may also offer similar advantages.

The systems and methods provided herein have many applications including, but are not limited to, modern cellular MIMO communication systems operating in small cell networks (such as micro cell, femto cell and pico cell) as well as wireless local area networks (WLAN) such as WiFi. The disclosed systems and methods become particularly advantageous to low-power, band-limited systems operating in dense network areas where high data rate, operational cost, and energy efficiency are crucial. In such environments, both the transmitter (e.g. base station) and receiver (e.g. user equipment) can adopt the disclosed system to maximize its benefits. The planar form of the aperture layer is also preferable in many installation sites and user equipment. Emerging applications also exist in internet of things, smart buildings, sensor networks, etc.

The disclosed metasurface antenna can be described as a waveguide (e.g. microstrip in one-dimensional (1D) or parallel plate waveguide in two-dimensional (2D)), or a cavity (e.g. hollow or dielectric-filled) that excites sub-wavelength-sized metamaterial radiators, etched into the top layer.

FIG. 3A is a schematic of a 2D metasurface antenna in accordance with embodiments of the disclosure. As shown, an antenna 300A includes a 2D metasurface, which includes multiple metasurface elements 304A arranged on a 2D plane. The metamaterial elements 304A are excited by a feed magnetic field $H_f$ (the real part is plotted in gray scale) supported by a waveguide, e.g. a cylindrical wave 314A. The antenna 300A transmits a single directed beam 310A with small side lobes.

FIG. 3B is a schematic of a 1D microstrip metasurface antenna and a feed magnetic field in accordance with embodiments of the disclosure. As shown, a 1D metasurface 300B includes multiple metasurface elements 304B arranged linearly on a 1D plane. The metamaterial elements 304B are excited by a feed magnetic field $H_f$ (the real part is plotted in gray scale) supported by a waveguide, e.g. a 1D traveling wave. The antenna 300B transmits a single beam 310B with small side lobes, which is less directed than the beam 310A.

FIG. 3C illustrates the metamaterial elements that are modeled by the effective magnetic dipoles corresponding to the feed magnetic field in accordance with embodiments of the disclosure. As shown, multiple magnetic dipoles 305 have amplitudes and phases correspond to the feed wave 314B.

Each metamaterial radiator 304B couples energy from the feed wave 314B into free space, resulting in a composite radiation pattern 310B formed from the superposition of the fields from each of the excited radiators. Different types of radiation patterns can be generated using the device; for instance, spatially distinct patterns and electronically-steerable beams can be generated using metasurface antennas. To create controlled field patterns, the electromagnetic response of each metamaterial element can be varied, introducing a means to vary amplitude and phase of the radiated field within some constraints.

The disclosed MIMO communication system is designed to attain both a multiplexing gain and a high receiving signal-to-noise ratio (SNR). The MIMO communication system includes reconfigurable cavity-backed metasurface antennas. The system is particularly attractive among many possible metasurface antenna configurations. In the MIMO communication system, the cavity acts as both a feeding device and a coding device between the RF ports and the metamaterial radiators. The feed wave in a feed layer (e.g. dielectric layer) within the cavity allows all of the RF ports to access all elements and gives each element a distinct complex weight for each port. In other words, the feed wave in the cavity provides a coupling mechanism that not only provides a unique set of weights to the elements for radiation, but also creates an independent feeding network between the RF ports and the metamaterial radiators.

The components in this configuration including metamaterial radiators, a cavity, and variations of the cavity are encapsulated in a single antenna structure and collectively form a simple, compact and energy efficient radiative system.

The reconfigurable cavity-backed metasurface antenna is unique in its structure and functionality compared to conventional reconfigurable MIMO antennas. First, the metasurface antenna takes advantage of having individually addressable metamaterial elements as radiators and does not rely on interconnected radiators nor parasitic elements. Individual tuning of the metamaterial elements not only enables partial control over the amplitude and phase of each element, but also the change of spacing between the radiating elements and the aperture size. The latter is a key mechanism of a MIMO communication system. Second, the metamaterial elements are fed directly by a planar cavity, which replaces the complex feeding structure associated with traditional arrays, thereby implementing a compact array antenna system with reconfigurable patterns. Such a compact and low cost platform has not been implemented in conventional systems including metasurface antennas.

The disclosure presents a spatial multiplexing (SM) system using reconfigurable cavity-backed metasurface antennas that can generate steer-able, concurrent beams. The system using the metasurface antennas can achieve a high capacity gain in clustered MIMO channels. The benefits of using such beams in the SM system and the mechanisms responsible for the capacity gain are studied. To enable these analyses, an example metasurface antenna and its design procedure are presented.

Figure 4A:
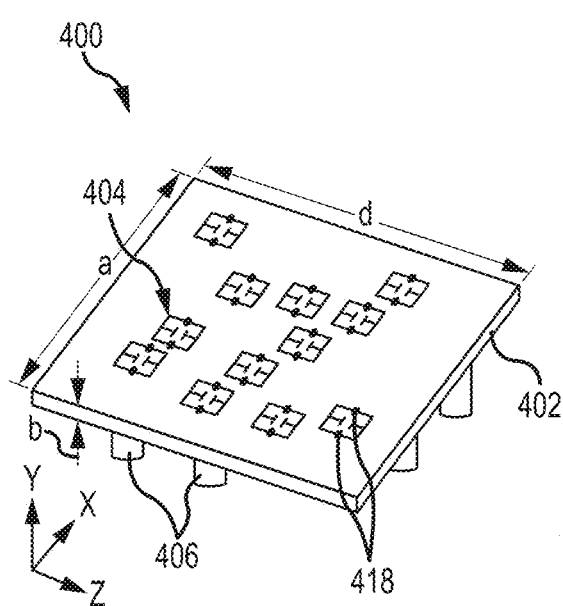
FIG. 4A is a schematic of a reconfigurable cavity-backed metasurface antenna system in accordance with embodiments of the disclosure.

FIG. 4A is a schematic of a reconfigurable cavity-backed metasurface antenna system in accordance with embodiments of the disclosure. As shown, a reconfigurable cavity-backed metasurface antenna system 400 includes a cavity 402 loaded with metamaterial elements 404. In this configuration, the cavity 402 is a double copper-clad dielectric substrate surrounded by metallic walls. The metamaterial elements 404 are etched into an upper layer 422, which is also referred to a radiative layer, a top plate, or a front plate in the disclosure. In the transmitting mode, the RF signals are injected into the cavity 402 through the coaxial probes 406 to form a spatially varying field 416 in a feed layer between the top plate 422 and bottom plate 424 within the cavity 402. In some cases, a dielectric material may be filled in the feed layer. The feed layer is coupled to the RF ports 406 or coaxial probes 406. The feed layer excites the metamaterial elements 404 which couple energy from a waveguide mode into a free space.

The disclosed MIMO communication system 400 also includes multiple RF ports 406, which can be used to inject signals into the cavity and excite the elements. Each RF port 406 is connected to a separate radio unit (not shown) so that each port acts as a separate input/output while the feed layer and the radiative layer 422 are shared.

Also, as shown in FIG. 4A, the system 400 may include active elements 418, such as diodes, coupled to each metasurface element 404. In some embodiments, the active elements are diodes, which may control each metasurface element 404 to be "on" or "off" independently.

Figure 4B:
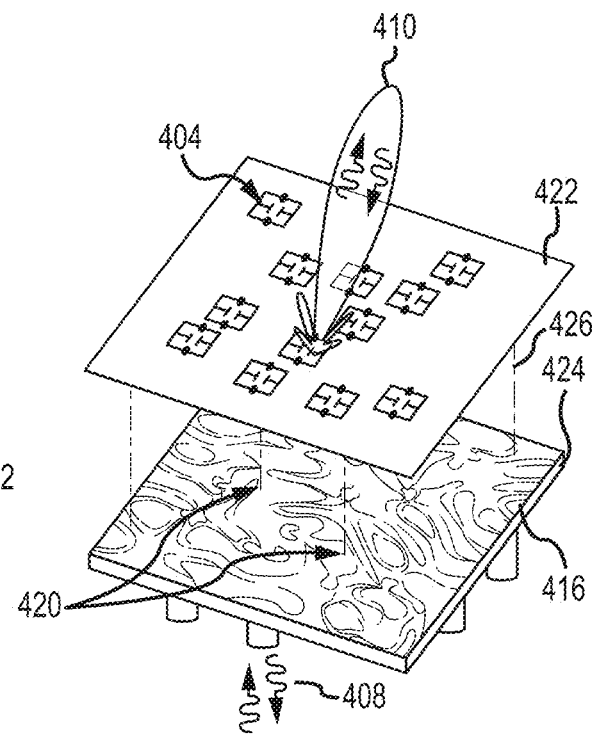
FIG. 4B is an exploded view of the antenna system of FIG. 4A for radiation and reception of the signal by the structure in accordance with embodiments of the disclosure.

FIG. 4B is an exploded view of the antenna system of FIG. 4A for radiation and reception of the signal by the structure in accordance with embodiments of the disclosure. The operation of the device in receiving signals follows the principle of reciprocity. As shown, a feed wave 416 is formed between the radiative layer 422 and the bottom plate 424 within the cavity 402. Also, the cavity may optionally include coaxial pins 420 extending along a Y direction and is within the cavity between the radiative layer 422 and the bottom plate 422. The top plate is parallel to the bottom plate in an X-Z plane. These coaxial probes serve as sources, emanating cylindrical waves within the cavity.

In some embodiments, the number of radiators (metamaterial elements, in this case) can be different from that of the RF ports. The feed layer acts as a multiplexing device and the radiators are excited with a given amplitude and phase, all encapsulated in a single antenna structure. In a receiving mode, when an RF signal impinges on the antenna, the signal is accepted by the radiative layer 422 and a spatially varying field is formed in the feed layer.

Figure 4C:
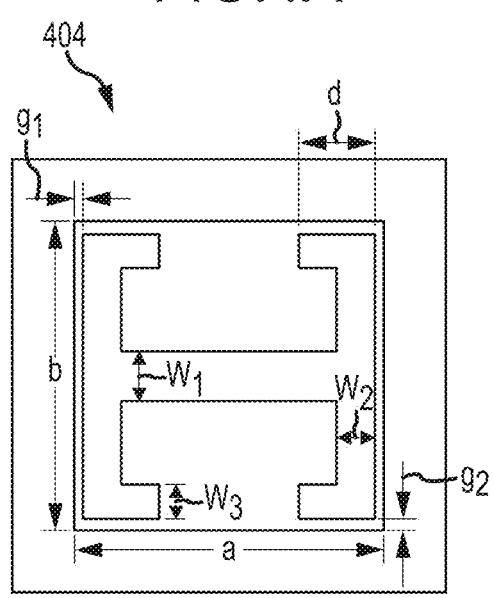
FIG. 4C illustrates the geometry of the example metamaterial element of FIG. 4A in accordance with embodiments of the disclosure.

FIG. 4C illustrates the geometry of the example metamaterial element of FIG. 4A in accordance with embodiments of the disclosure. The cavity 402 may be formed of a metal, such as copper. As an example, design parameters of the metasurface element are a=b=3.7 mm, d=1.2 mm, $w_1$=0.78 mm, $w_2$=0.6 mm, $w_3$=0.5 mm, $g_1$=0.2 mm, and $g_2$=0.4 mm.

Figure 4D:
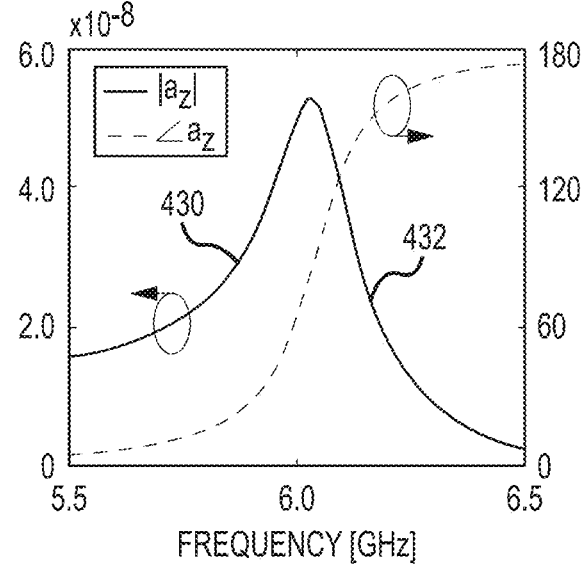
FIG. 4D illustrates the magnitude and phase of the extracted polarizability of the element of FIG. 4C in accordance with embodiments of the disclosure.

FIG. 4D illustrates the magnitude and phase of the extracted polarizability of the metasurface element of FIG. 4C in accordance with embodiments of the disclosure. As shown, the peak in the magnitude curve 430 occurs on resonance, where the metasurface element can radiate much of the incident power. The magnitude approaches zero and phase curve 432 shows that the phase approaches 0° or 180° far from resonance. It is important to note that the amplitude curve 430 and phase curve 432 of the field radiated by a metamaterial element are inherently coupled and, further, the resonance offers a limited phase span (less than 180°). These characteristics need to be considered in the metasurface antenna design. It should be noted that the element in FIG. 4C has not been optimized for the simulated antenna design, but this serves as an example element throughout the disclosure.

In the MIMO communication system, coupling between the RF ports in the feed layer should be avoided to ensure low signal correlation. To realize the desired level of isolation, the magnitude of the field generated by each port should be negligibly small at the locations of the other ports. In this manner, the signal paths in the cavity can be electrically separated. The exact process to ensure high isolation is dependent on the specific antenna geometry.

Characterizing the clusters for adapting the radiation patterns is essential in the disclosed system. Thus, periodically identifying clusters and tracking angle of arrival (AoA) and angle of departure (AoD) is important. For the cluster identification, several algorithms have been disclosed to estimate the cluster parameters. For the initial access and the track of AoA and AoD, several approaches are available; first, an iterative beamforming training approach, where the beamforming weights at the transmitter/receiver are optimized sequentially to improve the beamforming gain, can be adopted. Second, a switched beamforming approach can be taken where the beam search space at the transmitter and the receiver are respectively represented by codebooks to find the best pair of transmit and receive beams. Adaptive minimum mean square error (MMSE) beamforming is also a practical option for the system. Although beyond the scope of this disclosure, the detailed analysis of the approaches to dynamically characterizing the propagation environment remains an important consideration for practical systems. Throughout this disclosure, the cluster information is assumed to be known both to transmitter and receiver via the channel state information (CSI).

Typical sub-6 GHz MIMO channels are known to have many clusters that are often overlapped in angles, and thereby exhibit complex scattering environments. In such environments, metasurface antennas need to generate complex wave forms with several lobes, rather than well-defined beams, to match the patterns to the scattering properties. In such a case, metasurface antennas can have great potential in generating complex patterns.

Figure 5:
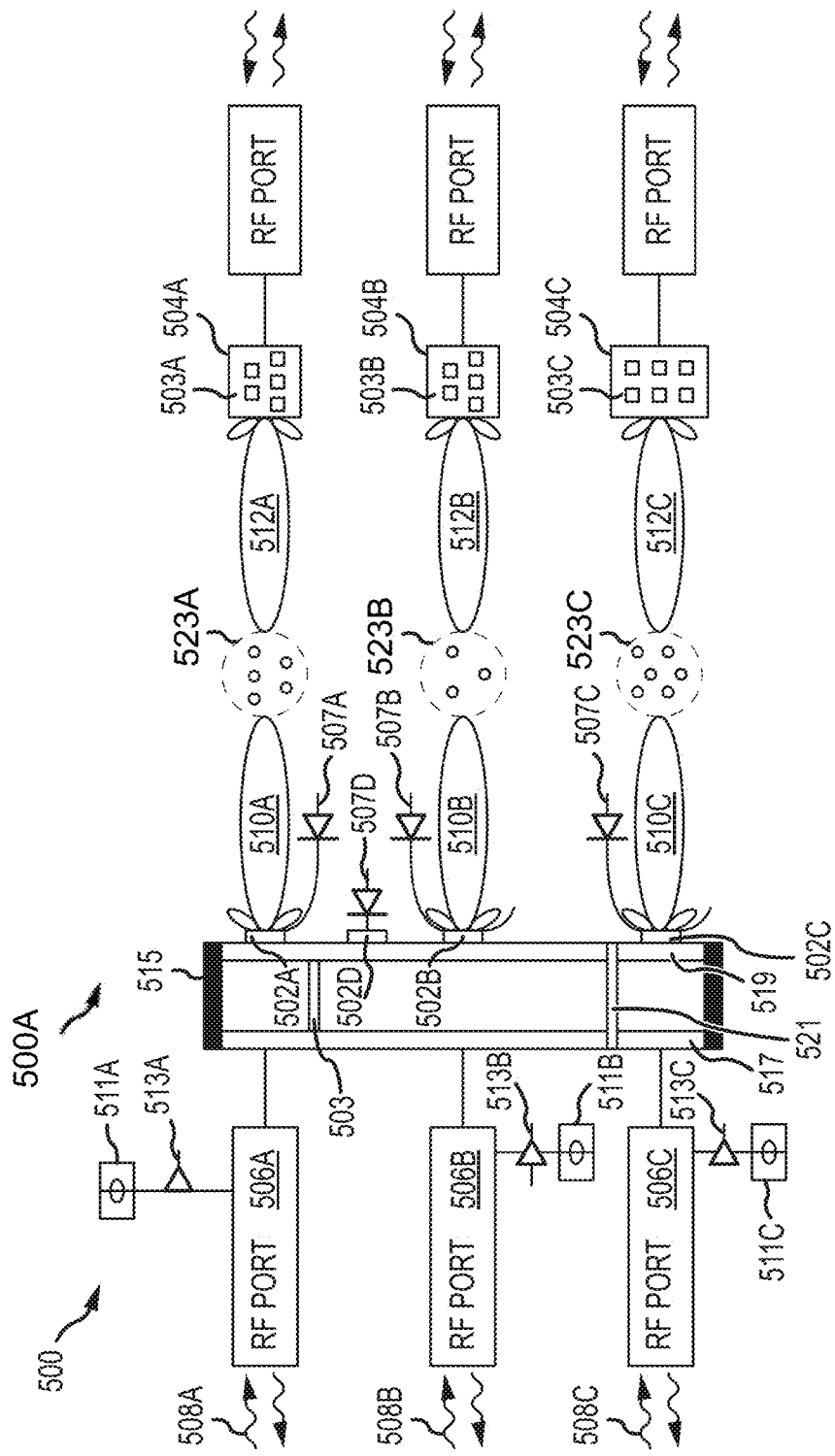
FIG. 5 illustrates a MIMO communication system including a base station and multiple individual users in accordance with embodiments of the disclosure.

FIG. 5 illustrates a MIMO communication system including a base station and multiple individual users in accordance with embodiments of the disclosure. As shown, a MIMO communication system 500 may include a base station 500A, which includes a cavity comprising two parallel metal plates 517 and 519. The base station 500A includes multiple metasurface elements, such as elements 502A-D on the metal plate 519.

Each metasurface element may be coupled to a respect active element 507A, 507B, 507C, or 507D, such as diodes or transistors for adjusting the element. The cavity 500A may include tunable impedance boundary 515 on a side between the two plates 517 and 519. The cavity 500A may also optionally include multiple conductive coaxial pins 503 within the cavity to form an irregular cavity. The cavity 500A may also optionally include conductive multiple cylindrical posts 521 along the side boundaries of the cavity between the two plates 517 and 519.

The system 500 may also include multiple RF ports coupled to the back plate 517, such as ports 506A-C. The front plate 519 including the metasurface elements acts as a radiative layer. Each of RF ports 506A-C may be optionally coupled to an amplifier and/or a phase shifter for adjustment of the respective signals 508A-C that are input to the RF port.

The base station generates multiple radiation patterns, such as patterns 510A-C corresponding to the respective RF ports 506A-C. These radiation patterns may be scattered by clustered regions 523A-C. Multiple antennas, such as 504A-C, include respective metasurface elements 503A-C are separated from each other. The antennas 504A-C receive the respective scattered radiation patterns 512A-C. The multiple antennas 504A-C may be mobile users, among others. Alternatively, the multiple antennas 504A-C may also be coupled to RF ports as shown, and act as a transmitter while the base station receives the signal from the multiple antennas.

Modulating Aspects—Irregular Cavity and Electronic Tuning

Dynamic control over the patterns can be achieved by introducing a tuning mechanism, such as diodes or liquid crystals, for electronic tuning of each metasurface element. The metasurface antennas thus avoid costly and power demanding radio frequency (RF) circuitry and active components. As a result, metasurface antennas have emerged as an enabling technology for a radiative platform with a simple, low-cost, and low profile configuration. Inspired by these advantages, a dynamic metasurface antenna aperture is used as the radiative layer of a spatial multiplexing (SM) system.

The coding or modulating aspect of the cavity can be manipulated by introducing a cavity irregularity, such as a tunable impedance boundary or conductive cylindrical posts positioned on the boundary of the cavity. This ability enables the weights of the elements to be modulated and can also be used to establish high isolation between the RF ports.

Figure 6A:
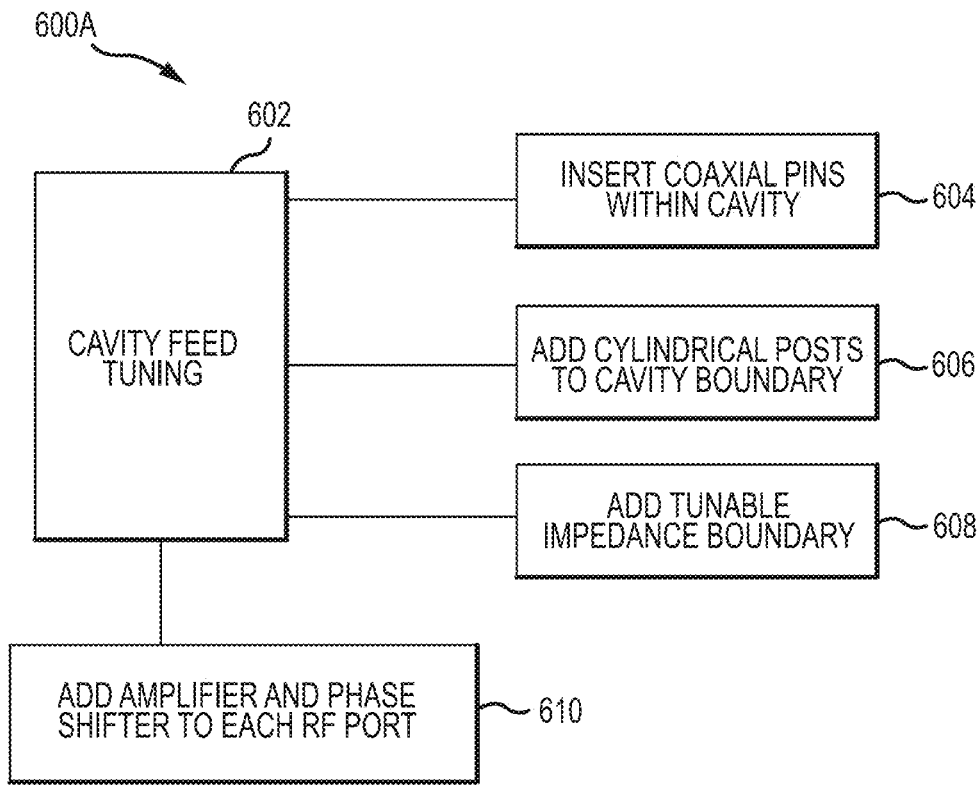
FIG. 6A illustrates a diagram for cavity feed tuning of the MIMO communication system of FIGS. 1-2 and FIG. 5 in accordance with embodiments of the disclosure.

FIG. 6A illustrates a diagram for cavity feed tuning of the MIMO communication system of FIGS. 1-2 and FIG. 5 in accordance with embodiments of the disclosure. As shown, the cavity feed tuning 602 may include inserting coaxial pins with the cavity at operation 604. The coaxial pins may be added to change the boundaries of the feed wave. These coaxial pins serve as sources for emanating cylindrical waves within the cavity.

The cavity feed tuning 602 may also include adding cylindrical posts to the cavity boundary at operation 606. The cylindrical posts can be added to form an irregular cavity. When the field is incident on the cylindrical post, it induces an electric current along the length of the cylindrical post and scatters the field as an electric monopole line source. The collection of cylindrical posts is designed to behave as electric conducting walls.

The cavity feed tuning 602 may also include adding tunable impedance boundaries at operation 608. The cavity can be utilized to excite the metamaterial elements due to its capability to support many modes of electromagnetic waves, which can be used to provide distinct feed waves. The tunable impedance boundaries can change the excited modes of a cavity to form distinct feed waves.

The cavity feed tuning 602 may further include adding an amplifier and a phase shifter to each RF port for adjustment of the amplitude and phase of the signals from a radio unit.

In addition to modulating the weights through the cavity's characteristics, electronic tuning of the elements allows significant freedom to design the radiation pattern of the antenna. Leveraging the relatively large design flexibility of the metasurface antenna, the capability of generating independent wave forms can be conveniently implemented in the cavity-backed configuration. In addition to all these functional aspects, the cavity-backed metasurface has a prominent structural advantage in its small form factor.

Figure 6B:
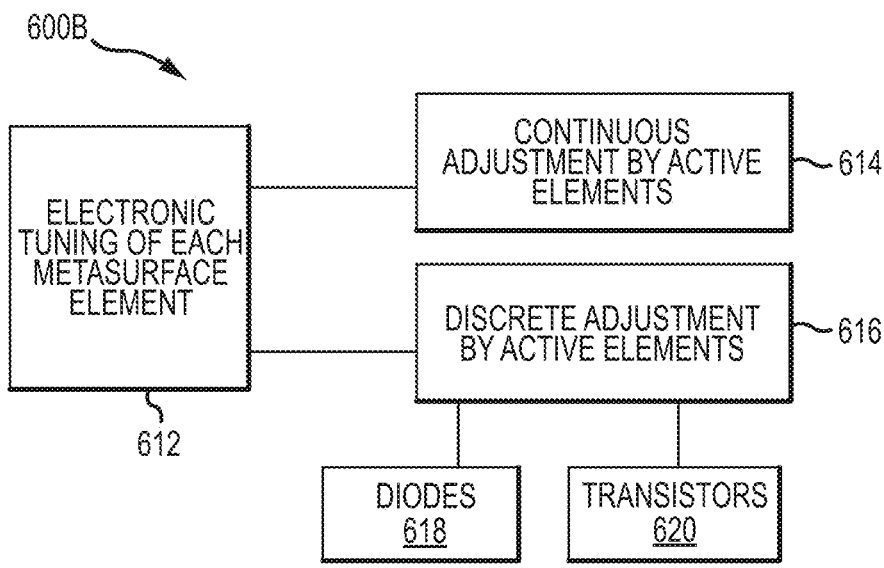
FIG. 6B illustrates a diagram for electronic tuning of the metasurface elements of the MIMO communication system of FIGS. 1-2 and FIG. 5 in accordance with embodiments of the disclosure.

The tuning of the element leads to a shift in the resonance frequency woof the cavity. FIG. 6B illustrates a diagram for electronic tuning of the metasurface elements of the MIMO communication system of FIGS. 1-2 and FIG. 5 in accordance with embodiments of the disclosure. Each metasurface element can also be electronically tuned. As shown, the electronic tuning for each element 612 may include adding active elements for continuous adjustment at operation 614. The electronic tuning for each element 612 may also include adding active elements for discrete adjustment at operation 616. The active elements may include diodes 618 for binary adjustment between two states or grayscale adjustment between two or more states. For example, the diodes may include varactor diodes, and pin diodes, among others. The active elements may also include transistors 620, among others. In some cases, other active elements or components may be coupled to each of the metasurface elements for continuous or discrete adjustment of amplitudes or phases.

Combining the electronic tuning and cavity feed tuning enables the system to tailor the radiation patterns to adapt to the characteristics of the propagation environments.

Artificially Structure Material Elements

Embodiments of the imaging systems and methods described herein can be realized using artificially-structured materials. Generally speaking, the electromagnetic properties of artificially-structured materials derive from their structural configurations, rather than or in addition to their material composition.

In some embodiments, the artificially-structured materials are metamaterials. Some exemplary metamaterials are described in R. A. Hyde et al., "Variable metamaterial apparatus," U.S. patent application Ser. No. 11/355,493; D. Smith et al., "Metamaterials," International Application No. PCT/US2005/026052; D. Smith et al., "Metamaterials negative refractive index," Science 305,788 (2004); D. Smith et al., "Indefinite materials," U.S. patent application Ser. No. 10/525,191; C. Caloz, and T. Itoh, "Electromagnetic Metamaterials. Transmission Line Theory and Microwave Applications," Wiley-Interscience, 2006; N. Engheta and R. W. Ziolkowski, eds., "Metamaterials. Physics and Engineering Explorations," Wiley-Interscience, 2006; and A. K. Sarychev and V. M. Shalaev, "Electrodynamics of Metamaterials," World Scientific, 2007; each of which is herein incorporated by reference.

Metamaterials generally feature sub-wavelength elements, i.e. structural elements with portions having electromagnetic length scales smaller than an operating wavelength of the metamaterial, and the sub-wavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the sub-wavelength elements, whereby the sub-wavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators-built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a non-conducting ferromagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the sub-wavelength elements. The selected permittivities, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/ visible wavelengths; the latter wavelengths are attainable, e.g., with nanostructured materials such as nano-rod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

The artificially-structured materials, as described herein, can be arranged on either a surface of a waveguide or on a surface of a cavity. Specifically, the artificially-structured materials can be arranged on either a surface of a waveguide or on a surface of a cavity for purposes of transmitting and/or receiving energy according to the methods and systems described herein. For example, the artificially structured materials can include complementary metamaterial elements such as those presented in D. R. Smith et al, "Metamaterials for surfaces and waveguides," U.S. Patent Application Publication No. 2010/0156573, and A. Bily et al, "Surface scattering antennas," U.S. Patent Application Publication No. 2012/0194399, each of which is herein incorporated by reference. As another example, the artificially-structured materials can include patch elements such as those presented in A. Bily et al, "Surface scattering antenna improvements," U.S. patent application Ser. No. 13/838,934, which is herein incorporated by reference.

Further, the artificially-structured materials, as described herein, can form, at least in part, metamaterial surface antennas. Metamaterial surface antennas, also known as surface scattering antennas, are described, for example, in U.S. Patent Application Publication No. 2012/0194399 (hereinafter "Bily I"). Surface scattering antennas that include a waveguide coupled to a plurality of sub-wavelength patch elements are described in U.S. Patent Application Publication No. 2014/0266946 (hereinafter "Bily II"). Surface scattering antennas that include a waveguide coupled to adjustable scattering elements loaded with lumped/active devices are described in U.S. Application Publication No. 2015/0318618 (hereinafter "Chen I"). Surface scattering antennas that feature a curved surface are described in U.S. Patent Application Publication No. 2015/0318620 (hereinafter "Black I"). Surface scattering antennas that include a waveguide coupled to a plurality of adjustably-loaded slots are described in U.S. Patent Application Publication No. 2015/0380828 (hereinafter "Black II"). And various holographic modulation pattern approaches for surface scattering antennas are described in U.S. Patent Application Publication No. 2015/0372389 (hereinafter "Chen II"). All of these patent applications are herein incorporated by reference in their entirety.

In these above references, "scattering elements" are referred to "sub-wavelength artificially structured material elements" in this disclosure. In some embodiments, the sub-wavelength artificially structured material elements are sub-wavelength metamaterial elements or sub-wavelength metasurface elements.

While the above references describe sub-wavelength scattering elements that are arranged on the surface of a waveguide, embodiments of the present disclosure include similar sub-wavelength artificially structured material elements arranged on the surface of a cavity.

Simulations of MIMO Communication System

The disclosure further provides the MIMO communication system using the simulated metasurface antenna and demonstrates the improvement of the channel capacity in the clustered MIMO channels. A point-to-point, narrowband flat-fading MIMO communication system consisting of $N_t$ transmitting antennas and $N_r$ receiving antennas is considered in a NLOS environment.

Tables 1-2 show all the symbols used in the disclosure.

TABLE 1

| Parameters | Description |
|---|---|
| $N_t$, $N_r$ | Number of transmit, receive antennas |
| x, y, n | Transmit, receive, noise vectors |
| ρ | Signal-to-noise power ratio |
| $R_t$, $R_r$ | Transmit, receive correlation matrices |
| H, $h_{ij}$ | MIMO channel matrix, and its entry |
| $H_\omega$ | Uncorrelated Rayleigh fading channel matrix |
| S(Ω) | Power angular spectrum |
| $S_\phi(\Omega)$, $S_\theta(\Omega)$ | Power azimuth, elevation spectrum |
| P(φ) | Truncated Laplacian distribution |
| $E_p(\Omega)$, $E_q(\Omega)$ | Far-field patterns of p-th, q-th antennas |
| $E_{iso}(\Omega)$ | Far-field patterns of isotropic radiator |
| $\varrho_{pq}, \varrho'_{pq}$ | Voltage correlation coefficient, modified coefficient |
| $\Omega_k$, $\phi_k$, $\theta_k$ | Solid angle, azimuth angle, elevation angle of k-th cluster |
| $\phi_c$, $\sigma_\phi$ | Mean cluster angle, angular standard deviation |

TABLE 2

| Parameters | Description |
|---|---|
| $\alpha_z$ | Polarizability of a metamaterial element |
| ω | Angular frequency |
| $\omega_0$ | Resonant frequency of a metamaterial element |
| F, γ, $Q_m$ | Filling, damping, quality factor of a metamaterial element |
| $\varepsilon_r$, tanδ | Relative permittivity, tangent loss of a substrate |
| $m_{z,i}$ | Magnetic dipole moment of i-th metamaterial element |
| $H_{z,f}$ | Magnetic field in a cavity (feed wave) |

TABLE 2-continued

| Parameters | Description |
| --- | --- |
| $\lambda_0, k_0$ | Free space wavelength, wavenumber |
| $E_{rad}$ | Total radiated field by a metasurface antenna |
| $\phi_p$ | Azimuth steering angle of a beam |
| w, $b_p$ | Beamforming weight, desired radiation pattern of p-th port |
| $\Delta_\phi$ | Difference in the steering angles of beams |
| $\kappa_\lambda$ | Condition number of MIMO channel matrix |
| $G_\lambda$ | Channel power gain |

Assuming that the channel is piece-wise constant over the transmitted symbols, the MIMO communication system for each symbol can be described as follows:

$$y = \sqrt{\rho} Hx + n, \quad (1)$$

where $x \in \mathbb{C}^{N_t \times 1}$ is the transmit signal vector normalized such that its entries follow $\mathbb{E}[|x_j|^2] = 1/N_t$ for $j \in \{1, 2, \ldots, N_t\}$ where $\mathbb{E}[\cdot]$ indicates the expectation is taken over the transmitted symbols. $y \in \mathbb{C}^{N_r \times 1}$ is the receive signal vector, $n \in \mathbb{C} N^{N_r \times 1}$ is the vector of baseband noise at the receiver, modeled as additive Gaussian noise with zero-mean and covariance matrix $\mathbb{E}[nn^H] = I_{N_r}$. $H \in \mathbb{C}^{N_r \times N_t}$ represents the MIMO channel matrix with complex channel gains between pairs of transmit and receive antennas. Note that most of multipaths arrive during one symbol time in narrowband flat-fading channels, and it allows modeling of the channel using a channel matrix with complex coefficients. p is the signal-to-noise power ratio at each receive antenna.

Assuming that the transmitted signals undergo Rayleigh fading in propagation channels, the MIMO channel matrix H in Eq. 1 can be generated using the Kronecker model and is described as follows:

$$H = R_r^{1/2} H_w (R_t^{1/2})^H, \quad (2)$$

where $H_w \in \mathbb{C}^{N_r \times N_t}$, is a matrix with complex fading coefficients, generated as circularly symmetric complex Gaussian with zero mean and unit variance. $R_t \in \mathbb{C}^{N_t \times N_t}$, $R_r \in \mathbb{C}^{N_r \times N_r}$ are the spatial correlation matrices at the transmitter and receiver, respectively.

The assumption of the Kronecker model that the correlation of the transmitter and receiver is independent and separable is known to underestimate the MIMO channel capacity. However, the Kronecker model is employed throughout this disclosure since it conveniently allows the separation of the transmit and receive correlation properties to provide a simple structure in examining the performance of MIMO communication systems. More sophisticated structures that make use of the transmit, receive correlation as well as the correlation across the link have been disclosed to accurately model broader classes of MIMO channels with practical relevance.

To construct the MIMO channel matrix H using the Kronecker structure, the transmit and receive spatial correlation matrices ($R_t$ and $R_r$ in Eq. 2) should be specified. The entries of the matrices are given by the open-circuit voltage correlation coefficient (see Example 3), expressed as follows:

$$\varrho_{pq} = \frac{\int_{4\pi} S(\Omega) E_p(\Omega) E_q^*(\Omega) d\Omega}{\sqrt{\int_{4\pi} S(\Omega) |E_p(\Omega)|^2 d\Omega} \sqrt{\int_{4\pi} S(\Omega) |E_p(\Omega)|^2 d\Omega}}, \quad (3)$$

where $S(\Omega)$ is the power angular spectrum of AoA/AoD, and $E_p$, $E_q$ represent the far-field patterns of p-th, q-th antennas with the same polarization, respectively. The voltage correlation coefficient ($\varrho_{pq}$) explicitly shows that the spatial correlation depends on the spatial characteristics of propagation channels as well as antenna's radiation patterns. It is worth noting that low spatial correlation ($R_t \approx 1$ and $R_r \approx 1$) can be achieved by generating a set of orthogonal patterns for the given power angular spectrum.

For MIMO channels with non-uniform power angular spectrum, signal energy is concentrated in certain directions, and therefore antenna gain needs to be considered. However, the autocorrelation coefficient in Eq. 3 is always normalized to be unity, and the impact of antenna gain on the performance of the MIMO communication system cannot be evaluated. To solve this, the correlation coefficient defined in Eq. 3 can be normalized differently to reflect antenna gain. Throughout the disclosure, the modified correlation coefficient is given as follows:

$$\varrho'_{pq} = \frac{\int_{4\pi} S(\Omega) E_p(\Omega) E_q^*(\Omega) d\Omega}{\int_{4\pi} S(\Omega) |E_{iso}(\Omega)|^2 d\Omega}, \quad (4)$$

where $E_{iso}(\Omega)$ is the radiation pattern of an isotropic antenna with the same polarization as that of $E_p(\Omega)$ and $E_q(\Omega)$. The radiated power is fixed by normalizing the power flowing out through the closed surface s as $$\oiint_S \frac{1}{2\eta_0} |E_{iso}(\Omega)|^2 ds = \oiint_S \frac{1}{2\eta_0} |E_i(\Omega)|^2 ds = 1.3 \text{ [mW]}.$$

Note that the modified correlation coefficient $\varrho_{pq}'$ in Eq. 4 considers cross-correlation as well as antenna gain of non-isotropic antennas in evaluating the performance of MIMO communication systems.

To compute the modified correlation coefficient in Eq. 4, the clustered MIMO channel model is adopted and extended to include directional information which has been shown to accurately match many propagation environments. In this channel model, geometrically co-located scattering objects in the propagation environment are grouped and modeled clusters, which are characterized by cluster parameters seen from the transmitter or the receiver. The mean angle of a path for kth cluster is defined as the mean cluster angle (denoted as the solid angle, $\Omega_k = (\phi_k, \theta_k)$ consisting of azimuth ($\phi_k$) and elevation ($\theta$) components). The angular spread (or the standard deviation $\sigma_{\phi,k}$) describes the angular distribution of the paths in each cluster. In this disclosure, assuming that the clusters are independent to simplify the analysis, and also assume that the power angular spectrum over the elevation angles $\theta$ is independent of the azimuth angles $\phi$, or mathematically, $S(\Omega) = S_\theta(\theta) S_\phi(\phi)$. In many indoor and cellular environments, elevation angle spread is small compared to azimuth angle spread and thus, assume that $S_\theta(\theta) = \delta(\theta - \pi/2)$ where $\delta(\cdot)$ is the delta function. For power azimuth spectrum (PAS), $S_\phi(\phi) = P(\phi) * \delta(\bar{\phi} - \phi_c)$, where * is the convolution operator and $\phi_c$ is the mean cluster angle. For PAS, the truncated Laplacian distribution is expressed as $$P(\phi) = \begin{cases} \dfrac{1}{\sqrt{2}\,\sigma_\phi\left(1 - e^{\sqrt{2}\pi/\sigma_\phi}\right)} e^{-\sqrt{2}|\phi|/\sigma_\phi}, & \text{if } \phi \in [-\pi, \pi) \\ 0, & \text{otherwise} \end{cases} \quad (5)$$

where $\sigma_\phi$ is the standard deviation of PAS.

The truncated Laplacian distribution has been proven to offer a reasonable fit for many indoor and urban areas. Normalizing $\int_{2\pi} P(\phi)d\phi = 1$ can ensure that $P(\phi)$ is the probability density function. The independence of clusters enables the channel model to simulate multiple cluster channels by adding the distributions characterizing the clusters. In this manner, simulating NLOS, clustered MIMO channels (characterized by cluster parameters $\phi_c$ and $\sigma_\phi$), and constructing the channel matrix H can evaluate the performance of MIMO communication systems.

As a performance metric, the ergodic capacity for spatial multiplexing systems is considered. Assuming equal power allocation across transmit antennas and uncorrelated transmit signal vector, the instantaneous capacity is expressed as follows:

$$C_{inst} = \log_2 \det\left(I_{N_r} + \frac{\rho}{N_t} HH^H\right), \quad (6)$$

where $\det(\cdot)$ is the determinant. Then, the ergodic capacity is erg $C_{erg} = \mathbb{E}_H[C_{inst}]$.

$H_\omega$ is generated with Rayleigh fading coefficients to construct the MIMO channel matrix H for the fixed, given set of radiation patterns and cluster parameters. Then, the ergodic capacity is obtained by taking the mean of the instantaneous capacity over many channel realizations (i.e. random fading coefficients). Note that the autocorrelation coefficient in Eq. 4 can exceed unity, and accordingly, the channel capacity of MIMO communication systems can exceed the capacity of the uncorrelated Rayleigh channel modeled by a normalized MIMO channel matrix. For the same reason, the channel matrix H is not normalized such that $\mathbb{E}[|h_{ij}|^2] = 1$ and therefore, $\rho$ should be scaled properly to represent receive power SNR in Eq. 6. Instead, a relative measure is defined for SNR gain obtained from the unnormalized H, and will use $\rho$ as a sweep parameter.

Simulated Sub-aperture Phased Array

Figure 7A:
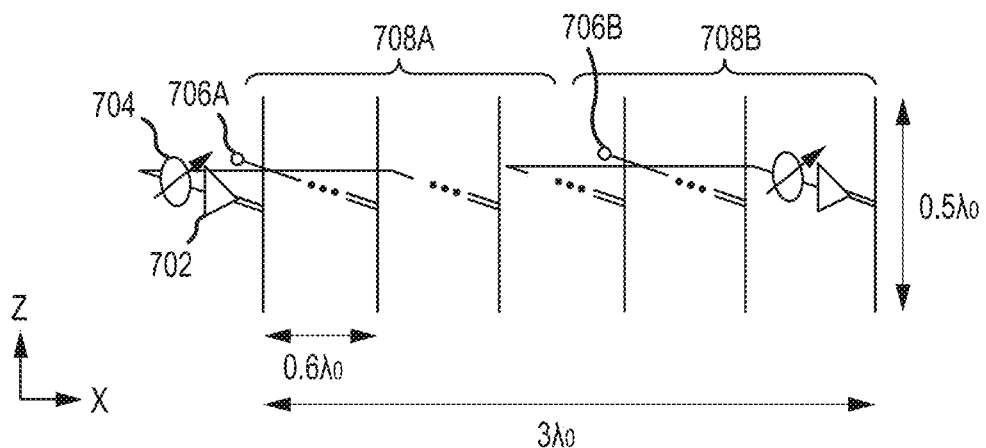
FIG. 7A is a schematic of the sub-aperture phased array in accordance with embodiments of the disclosure.

The schematic of the sub-aperture phased array is shown in FIG. 7A. As shown, an aperture 700 includes two sub-apertures 708A-B. The aperture 700 has an overall dimension of $3\lambda_0$ by $0.5\ \lambda_0$ in the X-Z plane. Each of half-wavelength dipoles 710A-B in each of sub-apertures 708A-B is weighted by each of power amplifiers 702A-B and each of phase shifters 704A-B. The dipole is directed along the Z direction.

Figure 7B:
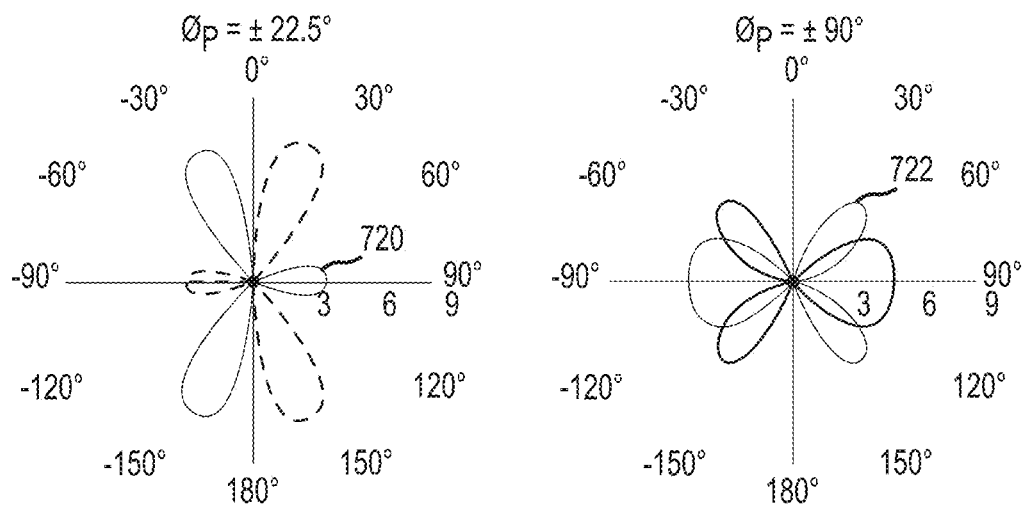
FIG. 7B illustrates directivity patterns of example pairs of steering angles (in dB scale) in accordance with embodiments of the disclosure.

FIG. 7B shows directivity patterns of the sub-aperture phased array for example pairs of steering angles. When the absolute value of the steering angle is greater than 45°, side lobes 722 become significant due to smaller aperture sizes of the sub-apertures. As shown, side lobes 720 are much smaller when the steering angle is ±22.5°. However, side lobes 722 become much larger when the steering angle is ±90°.

Example 1—Simulated Cavity-Backed Metasurface System

In the disclosure, a generic metasurface antenna model is used to conceptually develop a MIMO communication system based on the meta-surface antennas. Since the metasurface antennas are electrically large and include a large number of sub-wavelength artificially structured material elements (i.e. metamaterial elements or radiators), it is time-consuming to simulate/optimize using the full-wave electromagnetic solver for all tuning states of the metamaterial radiators and frequency points. Accordingly, a simulated reconfigurable cavity-backed metasurface antenna with two separate and steerable beams is presented.

The individual metamaterial element etched into the waveguide or cavity are well-approximated as a magnetic dipole, each characterized by a magnetic polarizability with the Lorentzian resonance form as follows:

$$\alpha_z(\omega) = \frac{F\omega^2}{\omega_0^2 - \omega^2 + j\omega\gamma}, \quad (7)$$

where $\omega$, $\omega_0$ are the angular frequency and the angular resonant frequency, respectively. F is a coupling factor, $\gamma = \omega_0/2Q_m$ is a damping factor, and $Q_m$ is the quality factor of the resonator. The subscript describes the polarization of the equivalent magnetic dipole (for example, $\alpha_z$ for the $\hat{z}$ polarized dipoles).

While the metamaterial element can exhibit higher order resonances and/or cross polarization radiation (such as $\alpha_z \neq 0$), such effects can be avoided by optimizing the shape of the element.

In the simulated metasurface antenna, a single metamaterial element shown in FIG. 4C was modeled in a parallel-plate waveguide and analyzed using a full-wave electromagnetic solver. The substrate filling the waveguide is 1.52-mm-thick TMM13i ($\epsilon_r = 12.2$ tan $\delta = 0.0019$) and the polarizability of the element $\alpha_z$ in this setting was retrieved. From the extracted polarizability, the Lorentzian parameters of the element were computed using the least-squares fit ($\omega_0/2\pi = 6.03$ GHz, $F = 1.18 \times 10^{-9}$ m³, $\overline{Q}_m = 21.03$).

Assuming that all the metamaterial elements are tunable and have similar orientation and can be described using only the $\hat{Z}$ component of the polarizability (i.e. $\alpha_z$) the magnetic dipole moment representing the i-th element as a function of w and the tuning state T is expressed as follows:

$$m_{z,i}(\omega, T) = \alpha_{z,i}(\omega, T) H_{z,f}(\overline{r}_i), \quad (8)$$

where $H_{z,f}$ represents the z component of the magnetic field in the cavity (referred as the feed wave), and $\overline{r}_i$ is the location of the ith element relative to the center of the metasurface antenna.

The tuning of the element leads to a shift in the resonance frequency $\omega_0$, which modulates the phase and amplitude of the polarizability according to the Lorentzian response in Eq. 7. While the tuning can change both the filling factor F and the damping factor $\gamma$ in Eq. 7, the shift of the resonant frequency is considered to simplify the analysis (i.e. $\omega_0 = \omega_0(T)$). In general, the feed wave stimulating the metamaterial elements is determined by the cavity's geometry, the dielectric constant of the dielectric substrate within the cavity, the locations/responses of the metasurface elements, and the feed locations for the RF ports. Here, the metamaterial elements are approximated as magnetic dipoles sampling the feed wave in the cavity, an approximation that is valid when the elements are weakly coupled to the feed wave. In this case, the elements do not perturb the feed wave significantly so that the feed wave is approximated as an expansion of the eigenmodes supported by a cavity. Furthermore, the metamaterial elements are assumed not to interact with each other. While generally optimistic, these assumptions turn out to provide good agreement with full-wave simulations of metasurface antennas. Though beyond the scope of the analysis presented here, a fully self-consistent modeling approach based on coupled dipoles can be adapted to account for mutual interactions of the radiating elements. Such an analysis is warranted when exact agreement between design and physical implementation is necessary.

Figure 8A:
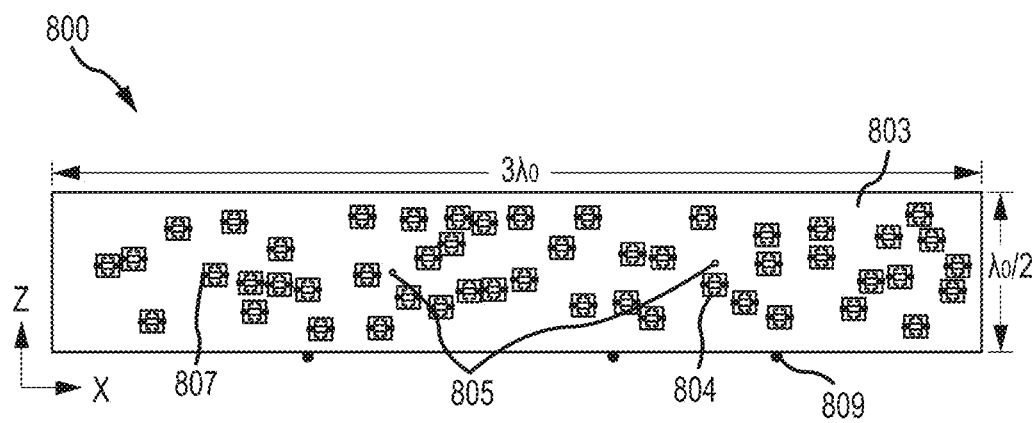
FIG. 8A is a schematic of the simulated cavity consisting of 50 tunable metamaterial elements in accordance with embodiments of the disclosure.

FIG. 8A is a schematic of the simulated cavity consisting of 50 tunable metamaterial elements. The geometry of the simulated printed cavity is illustrated in FIG. 8A. The dimension the aperture is that the length is $3\lambda_0$, cavity height b is $0.03\lambda_0$, the width is $0.5\lambda_0$ and the frequency is 5.9 GHz. The cavity consists of 50 metamaterial elements randomly distributed aver the aperture. In this work, a sufficient number of metamaterial radiators are chosen, based on numerical studies, such that the antenna can generate all desired radiation patterns. It will be appreciated by those skilled in the art that a rigorous study of the optimal number of radiators in a practical design of a cavity-backed metasurface antenna can be performed; such an analysis is required to arrive at a design that will have the access to the entire spatial extent of the aperture for all input signals.

Cylindrical Posts and Coaxial Pins

The feed structure of the metasurface antenna may include conducting cylindrical posts on the boundaries, forming an irregular cavity. When the field is incident on the cylindrical post, it induces an electric current along the length of the cylindrical post and scatters the field as an electric monopole line source. The collection of cylindrical posts is designed to behave as electric conducting walls.

The feed structure of the metasurface antenna consists of 408 conducting cylindrical posts 809 on the boundaries 811, forming an irregular cavity 800. When the field is incident on the cylindrical post 809, it induces an electric current in the y direction and scatters the field as an electric monopole line source. The collection of cylindrical posts here is designed to behave as electric conducting walls. As an example, the diameter of each post is 0.15 mm and the spacing between the posts is 0.5 mm (See Example 4). The dimension of the cavity is chosen to form an aperture with dimensions of $3\lambda_0$ by $0.5 \lambda_0$ at 5.9 GHz, and is filled with a dielectric substrate (1.52-mm-thick TMM13i).

The RF ports (coaxial probes) are coupled to the bottom of the cavity. The coaxial pins 805 are located within the cavity and extend along Y direction perpendicular to the X-Z plane, as shown in FIG. 8A. These coaxial probes serve as sources, emanating cylindrical waves within the cavity 800.

Feed Waves

Figure 8B:
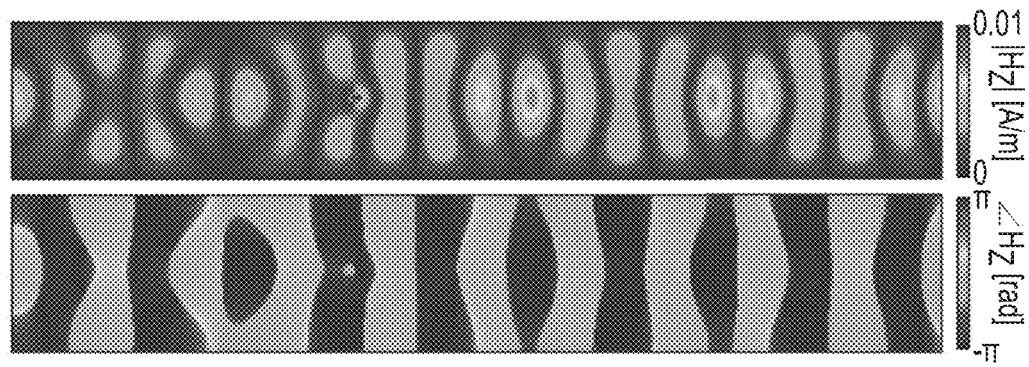
FIG. 8B illustrates the magnitude and phase of the feed wave at 5.9 GHz excited by port 1 in accordance with embodiments of the disclosure.
Figure 8C:
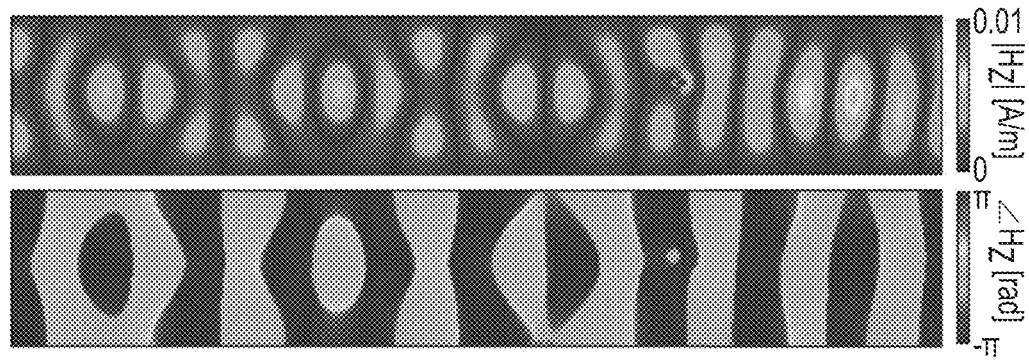
FIG. 8C illustrates the magnitude and phase of the feed wave at 5.9 GHz excited by port 2 in accordance with embodiments of the disclosure.

The magnitude and phase of the feed waves at 5.9 GHz are plotted in FIGS. 8B and 8C, by ports 1 and 2, respectively. In these simulations, the power injected in the cavity by the ports is fixed. As shown in FIGS. 8B and 8C, the magnitude and phase of the feed waves excited by the RF ports are distinct, effectively providing distinct feed waves to the metamaterial elements.

The feed waves inside the cavity excited by the ports are the sum of the field from the coaxial probes (acting as a monopole electric line source) and the field scattered by the conductive pins 805 and the fields scattered from the cylindrical posts 809.

Feed Locations

As discussed, the permittivity of the dielectric substrate within the cavity and the feed locations are critical factors in design since they define the feed wave, the radiated field, as well as the operating bandwidth of the antenna. In particular, the radiation patterns (and the antenna gain) should be maintained within the operating bandwidth, implying that the feed wave should not vary significantly over the given bandwidth. At the same time, distinct feed waves provide different phases and magnitudes at the metamaterial elements locations, giving rise to distinct radiation patterns from the same collection of metamaterial radiators. The dielectric constant and/or feed locations thus need to be carefully chosen to selectively excite eigenmodes of the cavity.

The feed locations of the RF ports can be determined by numerical studies. The port locations can be chosen such that the feed waves by the other RF ports are minimal. The feed wave has an electric field. It is desirable to have a maximum of the electric field to be at a given RF port, while minimum values or odes in the electric fields are situated at all other RF ports. This repeats for each RF port. For example, the next RF port may have an electric field maximum while all other RF ports have electric field nodes. This can be checked by exciting a given port and observing the field distribution in the cavity.

The locations of metamaterial elements were chosen randomly. In practical design of the antenna, locations of RF ports and metamaterial elements can be determined by applying optimization technique.

In some embodiments, aTMM13i dielectric substrate is selected and numerical trials are used to find the feed locations such that distinct feed waves excited by RF ports are preserved within the operating bandwidth.

Once the feed waves are simulated, the dipole moments of the elements $m_{z,i}$ are given in Eq. 8. Each of the metamaterial elements radiates as a magnetic dipole with an electric field pattern in the far-field given by [65]

$$\bar{E}_{rad,i} = -\frac{k_0 \omega \mu_0}{4\pi} \frac{e^{-jk_0|\bar{r}-\bar{r}_i|}}{|\bar{r}-\bar{r}_i|} m_{2,i}(\omega, T) \sin\theta \, \hat{\phi}, \qquad (9)$$

where $k_0 = 2\pi/\lambda_0, \mu_0, \hat{\phi}$ are the free space wavenumber, permeability of vacuum, a unit vector along the azimuthal direction in cylindrical coordinates, respectively. By combining Eq. 8 and 9, the total far-field pattern of the metasurface antenna is the sum of the radiated field by each metasurface element, expressed as:

$$\bar{E}_{rad} = -\sum_i \left[ \frac{k_0 \omega \mu_0}{4\pi} \frac{e^{-jk_0|\bar{r}-\bar{r}_i|}}{|\bar{r}-\bar{r}_i|} m_{2,i}(\omega, T) \sin\theta \right] \hat{\phi}, \qquad (10)$$

Here the tuning states (or weights) of the metamaterial elements can be considered as a set of accessible polarizabilities in the operating bandwidth, forming a design space for pattern synthesis. Since the polarizability, and thus the magnetic dipole moment, of each element can be modulated, the overall radiation pattern can be varied according to Eq. 10 with tunable polarizability $\alpha_{z,i}(\omega, T)$. Given the feed wave, synthesizing desired patterns from the simulated antenna, therefore, is equivalent to selecting the weights of the elements.

To generate two steerable beams from the simulated metasurface antenna, a nonlinear optimizer is applied to find the optimal weights of the elements. To consider the operation bandwidth of the antenna in addition to the radiation patterns, the objective function to be minimized was defined as $\Sigma_p \Sigma_k \|A_k w - b_p\|$; where $A_k$, W, $b_p$ are the terms in the bracket in Eq. 9 at k-th frequency point, the weights of the elements, the desired radiation pattern for the port p∈{1,2}, respectively ‖•‖ represents the Euclidean norm operator. For the desired radiation patterns $b_p$, a sinc function shifted by a targeted steering angle $\phi_p$ in the azimuth plane is used (i.e. $\hat{E}_0$ sinc(3($\phi-\hat{\phi}_p$))sinc(2($\theta-\pi/2$)) where $E_0$ is the electric field amplitude). The beamwidths of the desired patterns were chosen to be consistent with the antenna's aperture dimension. Different functions for the objective function and desired radiation patterns can be considered to synthesize patterns satisfying constraints such as beamwidth and sidelobe level.

Figure 9A:
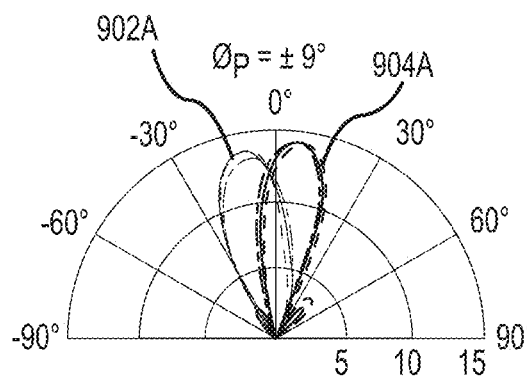
FIG. 9A illustrates directivity (plotted in dBi) of the simulated metasurface antenna of FIG. 8A with example pairs of steered angle $\phi_p=\pm 9°$ in accordance with embodiments of the disclosure.
Figure 9B:
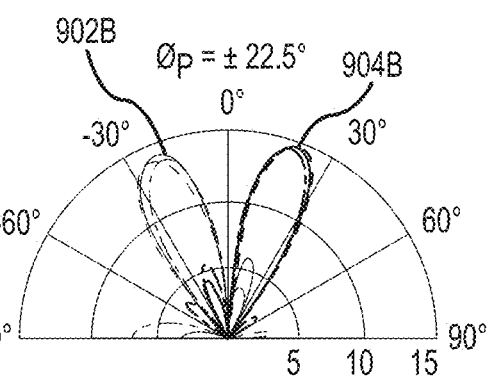
FIG. 9B illustrates the directivity (plotted in dBi) of the simulated metasurface antenna of FIG. 8A with example pairs of steered angle $\phi_p=\pm 22.5°$ in accordance with embodiments of the disclosure.
Figure 9C:
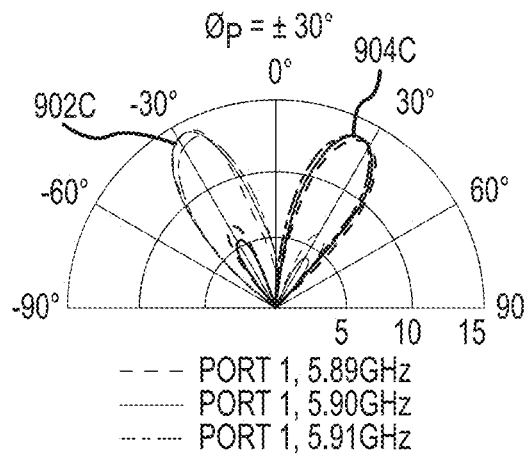
FIG. 9C illustrates the directivity (plotted in dBi) of the simulated metasurface antenna of FIG. 8A with example pairs of steered angle $\phi_p=\pm 30°$ in accordance with embodiments of the disclosure.
Figure 9D:
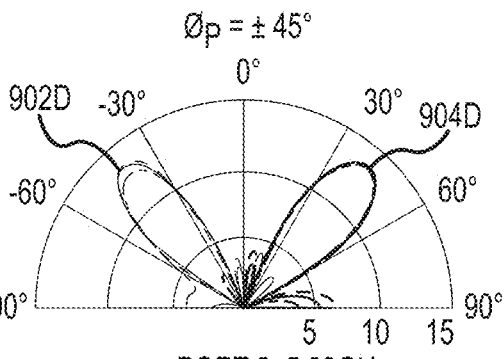
FIG. 9D illustrates the directivity (plotted in dBi) of the simulated metasurface antenna of FIG. 8A with example pairs of steered angle $\phi_p=\pm 45°$ in accordance with embodiments of the disclosure.

FIGS. 9A-9D show the radiation patterns of the simulated metasurface antenna for selected pairs of various steering angles and several swept frequencies. FIG. 9A illustrates directivity (plotted in dBi) of the simulated metasurface antenna of FIG. 8A with example pairs of steered angle $\phi_p=\pm 9°$. In particular, FIG. 9B illustrates directivity (plotted in dBi) of the simulated metasurface antenna of FIG. 8A with example pairs of steered angle $\phi_p=\pm 22.5°$, FIG. 9C illustrates directivity (plotted in dBi) of the simulated metasurface antenna of FIG. 8A with example pairs of steered angle $\phi_p=\pm 30°$, and FIG. 9D illustrates directivity (plotted in dBi) of the simulated metasurface antenna of FIG. 8A with example pairs of steered angle $\phi_p=\pm 45°$. The directive beams 902 and 904 generated by RF port 1 and RF port 2 are plotted for different frequencies; 5.89 GHz (dashed), 5.90 GHz (solid), 5.91 GHz (dotted).

The weights of the metamaterial elements are optimized for each pair of steering angles and the frequencies. In these plots, the radiation patterns generated by the metasurface antenna are divided by the radiation pattern of the isotropic antenna to obtain the directivity for the patterns. The results confirm that the simulated metasurface antenna can generate and steer beams with only minor changes in the directivity; for all cases, the directivity remains >13 dBi, and for each steering angle, little change over the swept frequencies is observed (<1 dB).

Note that the radiated power depends on the input power through the radiation efficiency of the antenna, which relates directivity to the antenna gain. In practical systems, the radiated power is similar to the input power, as long as the radiation efficiency is high. For a fair performance comparison between MIMO communication systems with different antenna configurations, assume that the efficiencies are the same for systems to be investigated in subsequent sections. Furthermore, assume a narrowband flat fading MIMO communication system, and accordingly, the radiation patterns generated by antennas are at 5.9 GHz. In practical systems with an operating bandwidth (e.g. 20 MHz), an orthogonal frequency-division multiplexing (OFDM) technique is employed and the narrowband analysis/model is applied to each subcarrier channel. In the OFDM scheme, the metasurface antenna can be designed to maintain the antenna properties in a frequency band including the subcarrier channels (as demonstrated in FIGS. 9A-D), provided that the MIMO channel does not change notably over the subcarrier channels. Otherwise, the metasurface antenna needs to create different sets of radiation patterns for the subcarrier channels to achieve the optimal system performance. These aspects should be considered in the implementation of the system.

Example 2—Simulated MIMO Channels with Single Cluster

The disclosure provides a conceptual development of a system and a basis for its extension to higher-order MIMO communication systems. For simulation, simpler scattering environments characterized by a single cluster or double clusters are assumed. Accordingly, a multitude of steerable beams are considered and their benefits are investigated in such MIMO channels. As an example, a 2-by-2 MIMO communication system is analyzed by assuming MIMO channels with a single cluster and double clusters and simulated to demonstrate the operation of the system.

In MIMO channels with a single cluster, it is reasonable to make full use of available sub-channels in the propagation environment. Thus, it is desirable to establish two spatial channels with low correlation and high receive SNR. To simplify the analysis, the simulated metasurface antenna and generated steerable beams symmetric to the mean cluster angle $\phi_c=0°$ (i.e. broadside) are considered. The angular standard deviation is assumed to be $\sigma_\phi=20°$. In practice, the cluster is bi-directional, and thus the mean cluster angle and the standard deviation are different at the transmitter and receiver. In addition, different antenna configurations are typically employed at the transmitter and receiver. Therefore, the transmitting and the receiving correlation matrices are generally different. In this work, however, the correlation matrices are assumed to be the same for the transmitter and receiver (i.e. $R_t=R_r$) since analyzing all possible combinations of the correlation matrices generated with different cluster parameters may not be practical. Note that it is desirable to investigate the benefits of using concurrent beams by the metasurface antennas in the clustered MIMO channels rather than to analyze the system performance in specific environments.

For comparison, a two-element uniform linear array (ULA) with the same aperture dimension (i.e. two passive half-wavelength antennas separated by $3\lambda_0$) is considered for the transmit and receive antennas. The spacing of $3\lambda_0$ is chosen to provide a high level of diversity. It should also be noted here that the ULA exhibits the minimal correlation in the broadside direction (i.e. $\phi_c=0°$). The radiation patterns of the ULA are computed using the far-field formula for half-wavelength dipoles.

A MIMO communication system using an active phased array including two sub-apertures is considered, each generating an independent, reconfigurable radiation pattern. A sub-aperture in this system is a three-element ULA, and each half-wavelength dipole is connected to a phase shifter and a power amplifier to provide amplitude and phase control. The spacing between the dipoles in a sub-aperture is chosen to be $0.6\lambda_0$, forming a sub-aperture with dimensions of $1.2\lambda_0$ by $0.5\lambda_0$. The two sub-apertures are fed by two different RF ports and the center-to-center distance is $1.8\lambda_0$. to achieve the overall aperture size of $3\lambda_0$ by $0.5\Delta\phi$. To generate a desired pattern, a convex optimization method is applied to find the optimal weights for dipoles in a sub-aperture. In this work, the antenna weights are optimized to minimize half-power beamwidths (HPBWs), and directivity of a sub-aperture in this system is calculated to be 7.5 dBi in the broadside direction (i.e. $\phi=0°$) and 5.0 dBi in the endfire direction (i.e. $\phi=90°$). Different pattern synthesis techniques for designing beamwidths and sidelobe levels are available; however, optimization techniques are relied on to navigate possibly a near-optimal solution for the given array configuration to achieve high capacity gain. It is worth noting that the sub-aperture phased array exploits pattern diversity (by means of independent, reconfigurable patterns) and spatial diversity (offered by two sub-apertures separated in space), while the cavity-backed metasurface antenna takes advantage of pattern diversity offered by a shared aperture. The architecture of the sub-aperture array and its example beam shapes are illustrated in Example 5.

To demonstrate the operation of the disclosed MIMO communication system using metasurface antennas, a 2-by-2 narrow-band MIMO communication system is simulated, according to Eq. 1. As the performance metric, the mean channel capacity is calculated over 10,000 realizations of the channel matrix using Eq. 2 (and Eq. 4) for each $\Delta\phi$, defined as the difference in the steering angles (i.e. $\Delta\phi \triangleq |\phi_1 - \phi_2|$). $\rho$ is fixed to be 10 dB. In constructing the correlation matrices (Eq. 4), the radiation patterns are normalized to fix the radiated power at the transmitter.

Figure 10A:
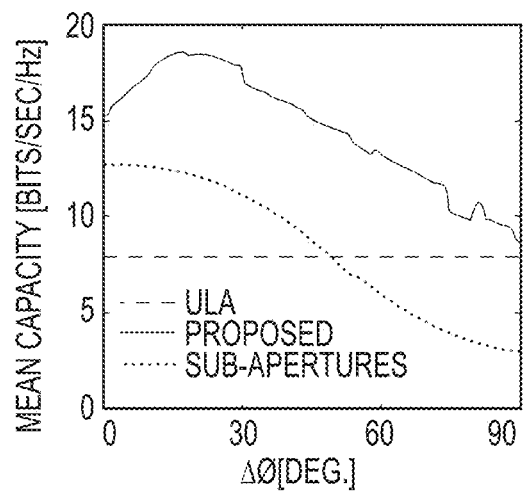
FIG. 10A illustrates the mean capacity of the MIMO communication systems as a function of $\Delta\phi$ ($\rho=10$ dB), where the mean capacity of the $K_{\lambda,ula}$ are independent of AO, but are plotted as lines for comparison with those of the disclosed system.

FIG. 10A illustrates the mean capacity of the MIMO communication systems as a function of $\Delta\phi$ ($\rho$=10 dB), where the mean capacity of the $K_{\lambda,ula}$ are independent of AO, but are plotted as lines for comparison with those of the disclosed system. As shown, the capacity increases as $\Delta\phi$ increases until it reaches its maximum of 18.6 [bits/sec/Hz] when $\Delta\phi$=16.2°, showing a significant enhancement compared to that of ULA which is 7.9 [bits/sec/Hz]. It is worth noting that the peak capacity is achieved when the beams are slightly offset from the mean cluster angle. For $\Delta\phi$>16.2°, the capacity decreases with small fluctuations due to the effect of side lobes. A similar behavior can be observed for the sub-aperture array antenna, providing the peak capacity of 12.8 [bits/sec/Hz] when $\Delta\phi$=1.8°. The capacity of the sub-aperture array system decreases for increasing $\Delta\phi$ and becomes lower than that of the ULA when $\Delta\phi$>49.5°. Note that the sub-aperture array antenna system provides high capacity over a wide range of $\Delta\phi$; for instance, 0.9 of the maximum capacity is maintained over 0°<$\Delta\phi$<33.3°. However, the metasurface antenna system offers higher capacity than that by the sub-aperture array system.

Figure 10B:
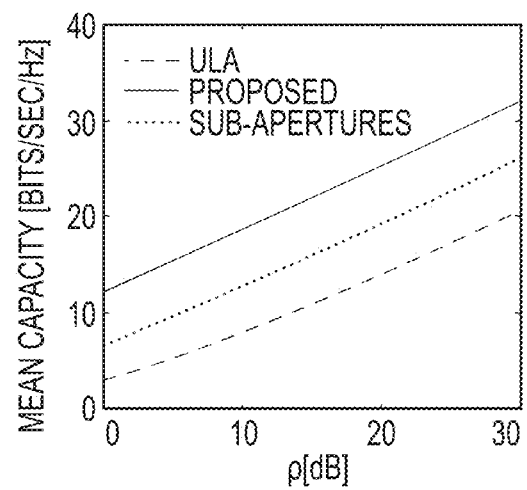
FIG. 10B illustrates the mean capacity of the MIMO communication systems as a function of $\rho$, where a single cluster is assumed ($\varphi_c=0°$, $\sigma_{\phi,1}=20°$).

FIG. 10B illustrates the mean capacity of the MIMO communication systems as a function of $\rho$, where a single cluster is assumed ($\phi_c$=0°, $\sigma_\phi$=20°). The mean capacity of the MIMO communication systems is shown as a function of $\rho$ by iterating the procedure to simulate the MIMO channels. The steering angles of the beams are chosen such that the system can achieve the highest capacity; $\Delta\phi$=16.2°, 1.8° for the metasurface and the sub-aperture array antennas, respectively. The disclosed system outperforms the sub-aperture array system and the ULA system for swept $\rho$. Within the swept range of $\rho$, approximately 17 dB increment in $\rho$ is required for the ULA system to achieve similar capacity offered by the disclosed metasurface system. Similarly, approximately 9.5 dB increment in $\rho$ is required for the sub-aperture array to obtain similar capacity provided by the metasurface system.

To identify the origin of the capacity gain in the MIMO communication system using the metasurface antennas, two measures of the MIMO communication systems are compared. First, the condition number of the instantaneous MIMO channel matrix is calculated, given as follows:

$$\kappa_\lambda \triangleq \lambda_{max}/\lambda_{min}, \tag{11}$$

where $\lambda_{max}$, $\lambda_{min}$ are the maximum and minimum singular values of the MIMO channel matrix H, respectively.

Figure 10C:
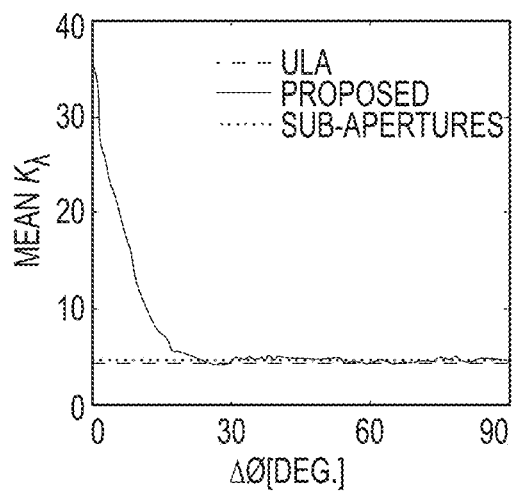
FIG. 10C illustrates the mean condition number of the channel matrices for each MIMO communication system in accordance with embodiments of the disclosure.

FIG. 10C illustrates the mean condition number of the channel matrices for each MIMO communication system, where the mean capacity of the $K_{\lambda,ula}$ are independent of AO, but are plotted as lines for comparison with those of the disclosed system. It is shown that the mean $K_\lambda$ of the disclosed system ($K_{\lambda,ula}$) decreases for increasing $\Delta\phi$ and reaches the mean $K_{\lambda,ula}$=4.5 offered by the ULA. It is known that $K_\lambda$ is primarily affected by the spatial correlation and the LOS component. Since NLOS environments are assumed in this analysis, low mean $K_\lambda$ here indicates that the multiple beams with optimal steering angles reduce spatial correlation. The maximum of the mean $K_{\lambda,meta}$ for $\Delta\phi$=0° thus implies that sub-channels of the metasurface system are highly correlated; high correlation is due to the fact that spatial diversity is not offered in the shared aperture configuration and highly overlapped beams do not provide pattern diversity. Unlike the metasurface antenna system, the sub-aperture array antenna system provides low mean $K_{\lambda,sub}$ over swept $\Delta\phi$ and its value is close to $K_{\lambda,ula}$ (i.e. $K_{\lambda,sub} \approx K_{\lambda,ula}$). The low mean $K_{\lambda,sub}$ for $\Delta\phi \neq 0°$ is attributed to the combination of pattern diversity and spatial diversity offered by the sub-aperture array. In contrast to the metasurface system, the mean $K_{\lambda,sub}$ for $\Delta\phi$=0° is comparable to $K_{\lambda,ula}$ and it is due to spatial diversity; while the beams generated by the sub-apertures are highly overlapped in this case, the sub-apertures are separated in space to offer spatial diversity.

Second, the mean of the total channel power (defined as $P_H \triangleq \text{tr}(HH^T)$ is compared relative to that of the ULA, given as follows:

$$G_\lambda \triangleq P_H/P_{H,ula}, \tag{12}$$

where $P_H$ is the channel power of the instantaneous channel matrix of the metasurface or sub-aperture array system and $P_{H,ula}$ is that of the ULA system.

Figure 10D:
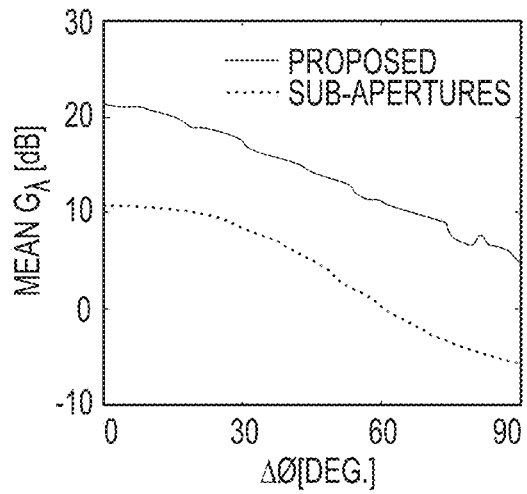
FIG. 10D illustrates the mean gain of the channel power of the MIMO communication system in accordance with embodiments of the disclosure.

FIG. 10D illustrates the mean gain of the channel power. In particular, FIG. 10D shows the computed mean $G_\lambda$ for the metasurface and the sub-aperture array antennas. As shown, the metasurface system provides higher mean $G_\lambda$ over swept $\Delta\phi$ due to higher directivity of the beams enabled by the shared aperture configuration. The mean $G_\lambda$ is the maximum when $\Delta\phi$0=0.9°, 1.8° for the metasurface and sub-aperture systems, respectively, and decrease for increasing $\Delta\phi$. For $\Delta\phi$>49.5°, $G_{\lambda,sub}$ becomes negative, meaning the loss in receive SNR compared to the ULA system. In addition, the mean $G_{\lambda,meta}$ for $\Delta\phi$=16.2° corresponds to 18.7 dB of receive SNR gain in total, the gain by the transmit and the receive metasurface antennas are 9.3 dB each, as discussed in FIG. 10B.

It should be noted that the peak capacity of the metasurface system in FIG. 10A does not occur when the mean $G_{\lambda,meta}$ is the maximum (i.e. $\Delta_\phi$=0.9°). This is on account of high mean $K_{\lambda,meta}$, indicating that the beams need to be slightly offset from the mean cluster angle $\phi_c$=0° for the highest capacity. Note that the metasurface system provides high capacity (e.g. 0.9 of the maximum capacity) for 7.2°<$\Delta\phi$<32.4° where the mean $G_{\lambda,meta}$ is high and the mean $K_{\lambda,meta}$ is low. This result confirms that the capacity is jointly determined by the mean $K_{\lambda,meta}$ and the mean $G_{\lambda,meta}$, where each compensates a loss by the other. The sub-aperture array antenna system, however, offers high capacity based on a different mechanism; the mean $G_{\lambda,sub}$ is kept low over the swept $\Delta\phi$ and thus high capacity is attained when high $G_{\lambda,sub}$ is achieved.

These analyses indicate that the capacity gain of the disclosed system in clustered MIMO channels is attributed to achieving low spatial correlation and high receive SNR by a multitude of steerable beams. Spatial correlation is mitigated by having separate beams, while the high SNR is addressed by steering each of those beams. The sub-aperture array antennas can generate such beams, but offer smaller capacity gain due to lower directivity provided by the use of multiple smaller sub-apertures. The capacity gain by the metasurface antenna system is unavailable in conventional MIMO communication systems using low-gain, omnidirectional antennas. The disclosed MIMO communication system does not require additional transmit power to improve receive SNR, and thus the metasurface antenna is an attractive solution for a compact, reconfigurable MIMO antenna.

Figure 11A:
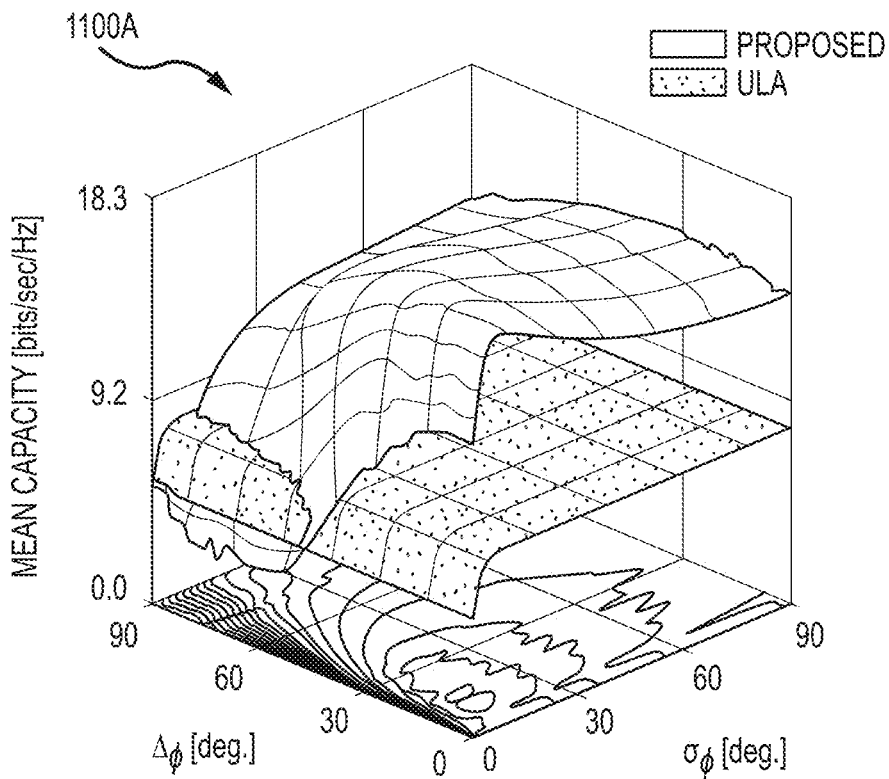
FIG. 11A illustrates the example mean capacity of the MIMO communication systems in channels with single cluster as a function of $\Delta\phi$ and angular spread $\sigma_\phi$, where the half-power beamwidths of the patterns generated by the simulated metasurface antennas are 25.4° and $\phi_c=0°$, $\rho=10$ dB are assumed.
Figure 11B:
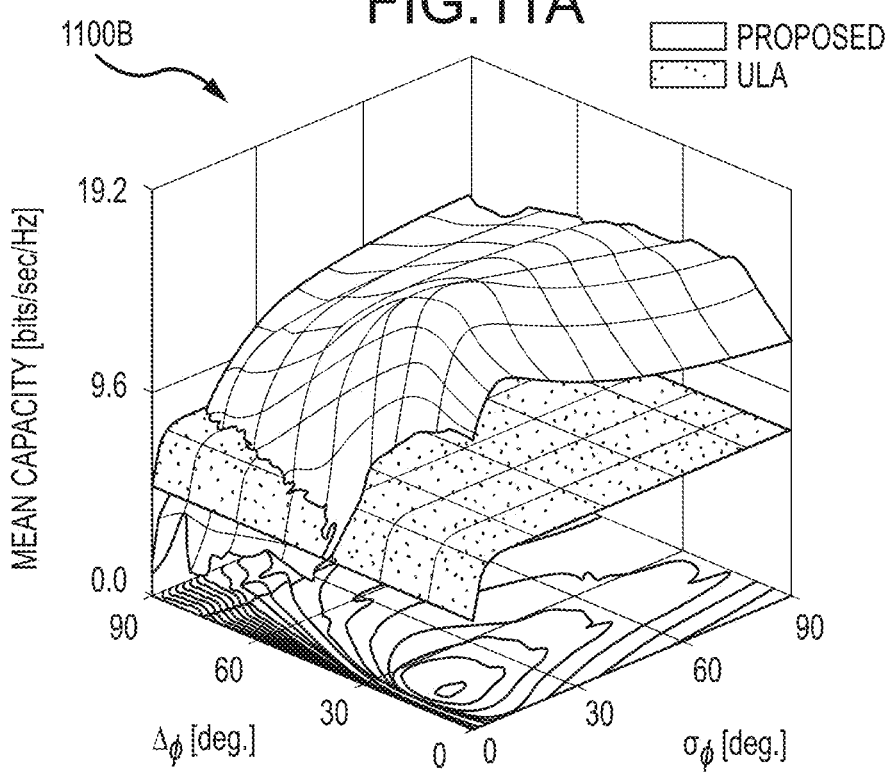
FIG. 11B illustrates the example mean capacity of the MIMO communication systems in channels with single cluster as a function of $\Delta\phi$ and angular spread $\sigma_\phi$, where the half-power beamwidths of the patterns generated by the simulated metasurface antennas area 16.9° and $\phi_c=0°$, $\rho=10$ dB are assumed.

The effect of beamwidth and angle spread of the cluster on the system performance is also studied. FIGS. 11A and 11B show the mean capacity of the disclosed MIMO communication system for different half-power beamwidths (HPBWs), as a function of $\Delta\phi$ and angle spread $\sigma_\phi$. FIG. 11A illustrates the mean capacity of the MIMO communication systems in channels with single cluster as a function of $\Delta\phi$ and angular spread $\sigma_\phi$, where the half-power beamwidths of the patterns generated by the simulated metasurface antennas are 25.4° and $\phi_c=00$, $\rho=10$ dB are assumed. FIG. 11B illustrates the mean capacity of the MIMO communication systems in channels with single cluster as a function of $\Delta\phi$ and angular spread $\sigma_\phi$, where the half-power beamwidths of the patterns generated by the simulated metasurface antennas area 1.6.0° and $\phi_c=00$, $\rho=10$ dB are assumed.

In these calculations, 10,000 channels are generated with fixed $\phi_c=0°$ and applied the instantaneous capacity formula with p=10 dB. For comparison, the mean capacity of the ULA is also plotted, showing that the capacity is improved as the angle spread $\sigma_\phi$ increases, as expected by the previous theoretical analyses. For the metasurface, however, the mean capacity varies over $\Delta\phi$ and $\sigma_\phi$ and it is shown that the disclosed system offers higher capacity over the broad range of $\Delta\phi$ and $\sigma_\phi$. In particular, the maximum of the mean capacity for each HPBW is calculated to be 18.3 [bits/sec/Hz] (when $\Delta\phi=10.8°$, $\sigma_\phi=11.9°$), and 19.2 [bits/sec/Hz] (when $\Delta\phi=16.2°$, $\sigma_\phi=10.9°$), respectively, as compared again to the ULA result of 7.9 [bits/sec/Hz]. In addition, for fixed angle spread $\sigma_\phi$, the mean capacity of the disclosed system decreases for large $\Delta\phi$. This trend confirms that the beams should be shaped and steered such that the beams receive most of the incoming signals' power to achieve high capacity. For large $\Delta\phi$ and small $\sigma_\phi$ ($\sigma_\phi<14.8°,16.8°$ for HPBWs of 25.4°, 16.9°, respectively), the capacity of the metasurface system becomes lower than that of the ULA, and it is attributed to low SNR gain since the generated beams are steered at directions away from the mean cluster angle $\phi_c=0°$. It should be also noted that the system with narrower beams by the metasurface antennas can offer higher capacity than that by broader beams, but the capacity exhibits a rapid variation over $\Delta\phi$ and $\sigma_\phi$ (see the contour plots in FIGS. 11A-11B). It implies that the beamwidths and steering angles can be varied and adjusted for high data rate or broader coverage.

Example 3—Simulated MIMO Channels with Double Clusters

Two clusters are generated with variable mean cluster angles ($\phi_{c,1}$ and $\phi_{c,2}$), and analyze the system performance. In this analysis, HPBW of the beams generated by the metasurface antennas to 16.9° is fixed. Two independent clusters are assumed with the same angle spreads $\sigma_{\phi,1}=\sigma\phi_{c,2}$. Since the clusters are independent, the PAS is generated by adding two Laplacian distributions with swept $\phi_{c,1}$ and $\phi_{c,2}$; here each ranges from −45° to 45°. 10,000 channels are generated for each pair of $\phi_{c,1}$ and $\phi_{c,2}$ under the assumption that $R_t=R_r$. For each channel, $\rho$ is assumed to be 10 dB to compute the capacity.

In these simulations, optimal steering angles of the beams for each pair of cluster angles were searched to maximize the capacity. To reduce the search time, a look-up table is created to relate $|\phi_{c,1}-\phi_{c,2}|$ to optimal $\Delta\phi$. The look-up table thus provides the optimal $\Delta\phi$ that achieves the maximum capacity for the given HPBWs (in this case, 16.9°) and the given angle spreads ($\sigma_{\phi,1}$, $\phi_{\phi,2}$).

Figure 12A:
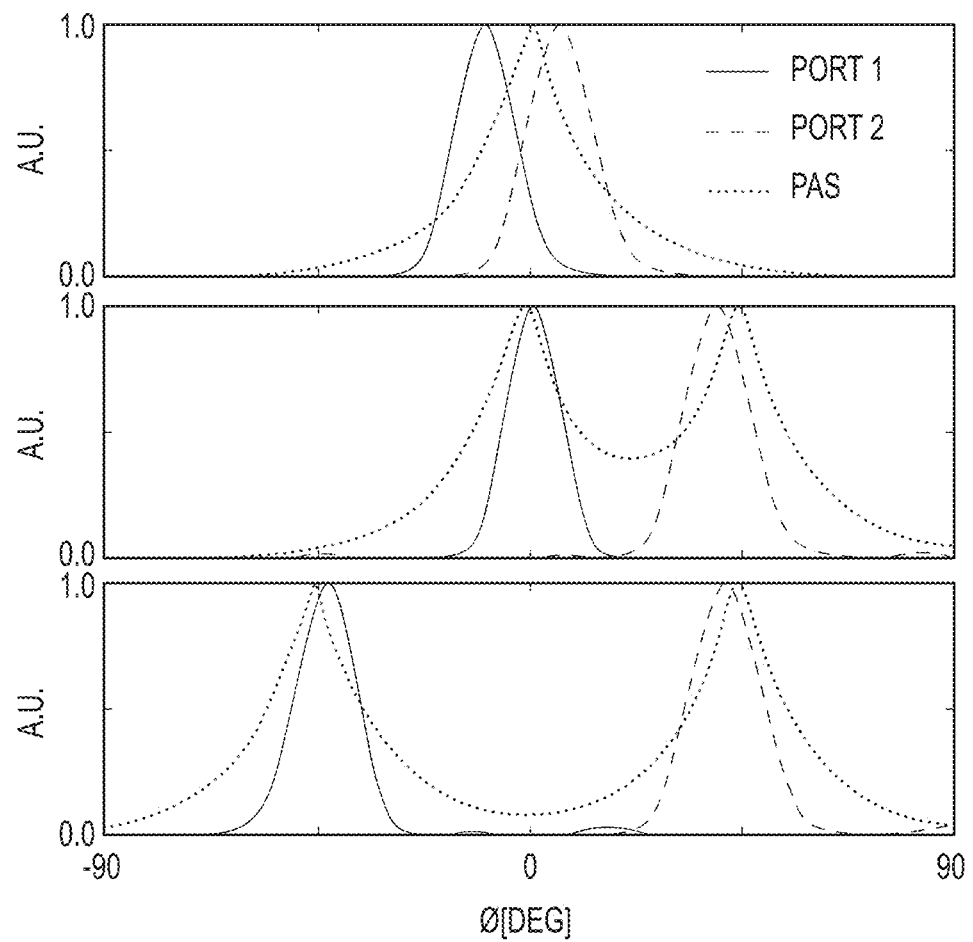
FIG. 12A illustrates an example operation of the disclosed MIMO communication system in channels with double clusters, where the angle spreads are set to $\sigma_{\phi,1}=\sigma_{\phi,2}=20°$.

FIG. 12A illustrates the example operation of the disclosed MIMO communication system in channels with double clusters. The disclosed system uses the look-up table for MIMO channels with double clusters. For demonstration purpose, the directivity of the beams, PAS (with $\sigma_{\phi,1}=\sigma_{\phi,2}=20°$) are normalized in magnitude and plotted together in linear-scale. When $\phi_{c,1}=\phi_{c,2}=1°$ (i.e. effectively MIMO channels with single cluster), the beams are slightly offset from the mean cluster angle to maximize capacity (FIG. 12B, top), as discussed earlier. As the mean cluster angles are varied and separated, each beam generated by the metasurface antenna is steered closely at each of the cluster angle (FIGS. 12A, middle and bottom). To better demonstrate the operation of the system, the mean capacity is calculated for each set of $\phi_{c,1}$, $\phi_{c,1}$ in FIG. 12A, and the capacity for each case is calculated to be 18.1, 16.6, 15.9 [bits/sec/Hz], respectively. The performance measures are calculated for each set of the cluster angles; the mean $K_\lambda$, is calculated to be 8.2, 4.9, 4.5, respectively, and the mean $G_\lambda$ in each case is 18.6, 14.3, 13.0 [dB], respectively. These measures indicate that high mean $K_\lambda$ needs to be compensated by high mean $G_\lambda$ to obtain the capacity gain when the clusters are close to each other. When the clusters are separated in angles, low mean $K_\lambda$ compensates low mean $G_\lambda$ to provide the capacity gain. The analysis for constructing the look-up table also indicates that the metasurface system can achieve high capacity by pointing each beam to each cluster rather than focus the beams toward one cluster among others.

The angle spreads are set to $\sigma_{\phi,1}=\sigma_{\phi,2}=20°$. The beams generated by the metasurface antenna are steered closely at the given mean cluster angles (top: $\phi_{c,1}=\phi_{c,2}=1°$, middle: $\phi_{c,1}=-1°$, $\phi_{c,2}=45°$, bottom: $\phi_{c,1}=-45°$, $\phi_{c,2}=45°$). Directivity and PAS are normalized in magnitude and plotted together in linear-scale plots.

Figure 12B:
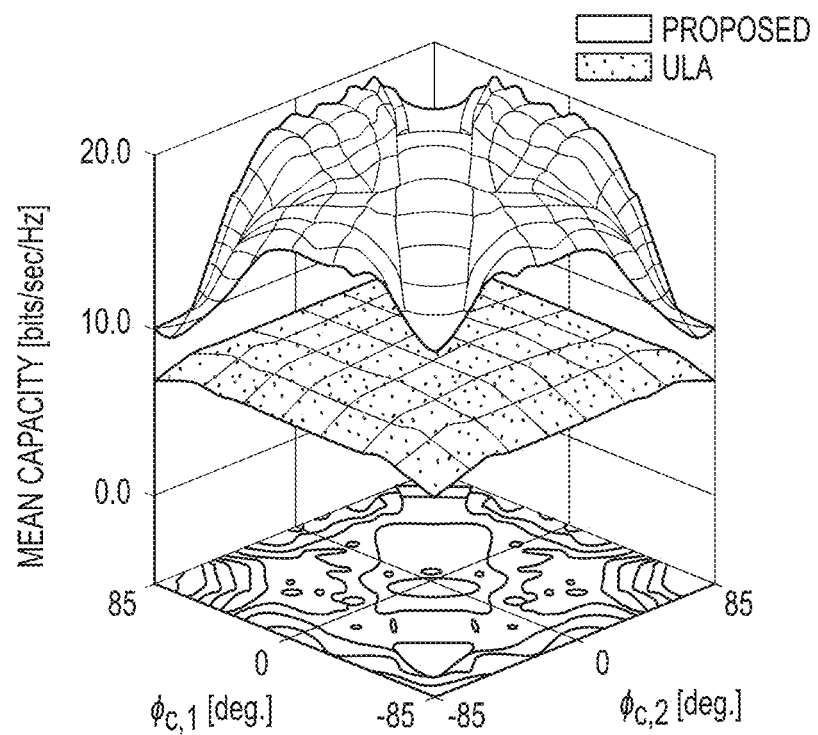
FIG. 12B illustrates the mean capacity of the MIMO communication systems in MIMO channels with double clusters when $\sigma_{\phi,1}=\sigma_{\phi,2}=20°$, where the half-power beamwidth of each beam by the metasurface antennas is set to 16.9°, and $\rho=10$ dB is assumed.
Figure 12C:
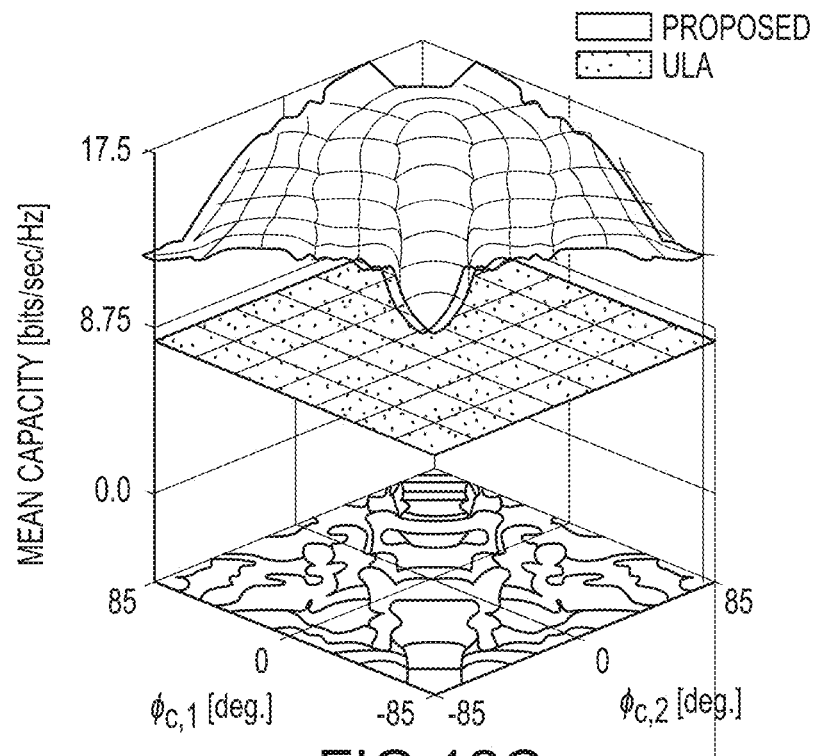
FIG. 12C illustrates the mean capacity of the MIMO communication systems in MIMO channels with double clusters when $\sigma_{\phi,1}=\sigma_{\phi,2}=60°$, where the half-power beamwidth of each beam by the metasurface antennas is set to 16.9°, and $\rho=10$ dB is assumed.

FIGS. 12B-C illustrate the mean capacity of the MIMO communication systems in MIMO channels with double clusters when (B) $\sigma_{\phi,1}=\sigma_{\phi,2}=20°$, and (C) $\sigma_{\phi,1}=\sigma_{\phi,2}=60°$. The same data for the disclosed system is shown as contour plots. The half-power beamwidth of each beam by the metasurface antennas is set to 16.9°. In these simulations, $\rho=10$ dB is assumed.

As depicted in FIGS. 12B and 12C, the disclosed system offers significantly higher capacity relative to the ULA; 2.1-fold, 1.9-fold averaged enhancements over the swept mean cluster angles for the given angle spreads, respectively. The capacity fluctuates over the cluster angles due to side lobes of the beams, and the maximum capacity occurs when the clusters are close to each other (i.e. $\phi_{c,1}\approx\phi_{c,2}$). In addition, the capacity decreases as the mean cluster angles increase, and it is due to the decrease in the effective aperture size. In addition, the capacity decreases rapidly for FIG. 12B than FIG. 12C due to smaller angular spreads (i.e. $\sigma_{c,1}\approx\phi_{c,2}$). For the ULA system, the capacity does not vary much over the swept cluster angles and it is a result of low spatial correlation offered by the system. However, the capacity decreases significantly near endfire directions (i.e. $\phi_{c,1}$, $\phi_{c,2}\approx\pm90°$) and calculated to be 6.8 and 7.7 for angle spreads of 20° and 60°, respectively.

To identify the mechanism responsible for the capacity gain of the disclosed system in the MIMO channels, the mean $K_\lambda$ and mean $G_\lambda$ are calculated. For the metasurface and the ULA systems, the averaged $K_\lambda$ is respectively 8.5, 4.7 (the minimum of 4.2, 4.1) for FIG. 12B, and 6.5, 4.5 (the minimum of 4.2, 4.1) for FIG. 12C, indicating the comparable level of spatial correlation. The averaged channel power gains $G_\lambda$ for the angle spreads at the transmitter or receiver are 13.3 dB and 11.6 dB for FIGS. 12B and 12C, respectively. These results show that high capacity gain in MIMO channels with double clusters requires low correlation and high SNR gain, as in the single cluster case. At this point, it should be noted that a multitude of steerable beams by the metasurface antennas are essential to achieve the high capacity gain in these analyses.

Example 4—Design of Cylindrical Posts

Figure 13A:
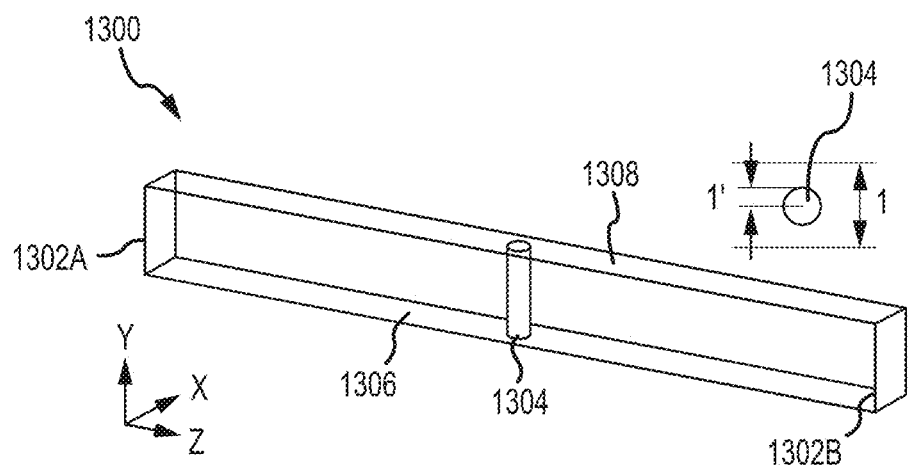
FIG. 13A is a simulation setup for the cylindrical post embedded in a dielectric-filled waveguide in accordance with embodiments of the disclosure.

The cylindrical post is designed for the simulated cavity. The cylindrical post made of copper is immersed in a waveguide including a dielectric material (e.g. 1.52-mm-thick TMM13i). FIG. 13A is a simulation setup for the cylindrical post embedded in a dielectric material filled waveguide. A top and a perspective view of the cylindrical post 1304 are shown in FIG. 13A. The top view in an X-Z plane shows the dimension of the diameter of the post and the dimension of the aperture. The perspective view shows that the cylindrical post 1304 is located along the boundary of the cavity 1300 and extends along a Y direction from the bottom plate 1309 to the radiating layer or the top plate.

The cylindrical post 1304 is analyzed using the full-wave electromagnetic solver (CST Microwave Studio). To simulate an infinitely long array of cylindrical posts in the transverse direction of the waveguide (X direction), ideal electric conductor boundaries are assigned to top 1308 and bottom 1309, and ideal magnetic conductor boundaries are applied to side boundaries 1302A-B. Waveguide ports located at side boundaries 1302A-B and are used to excite the structure, and S-parameters are calculated. In the simulations, the design parameters (i.e. post diameter r or dimension/along x direction are 0.075 mm and 0.5 mm, respectively.

Figure 13B:
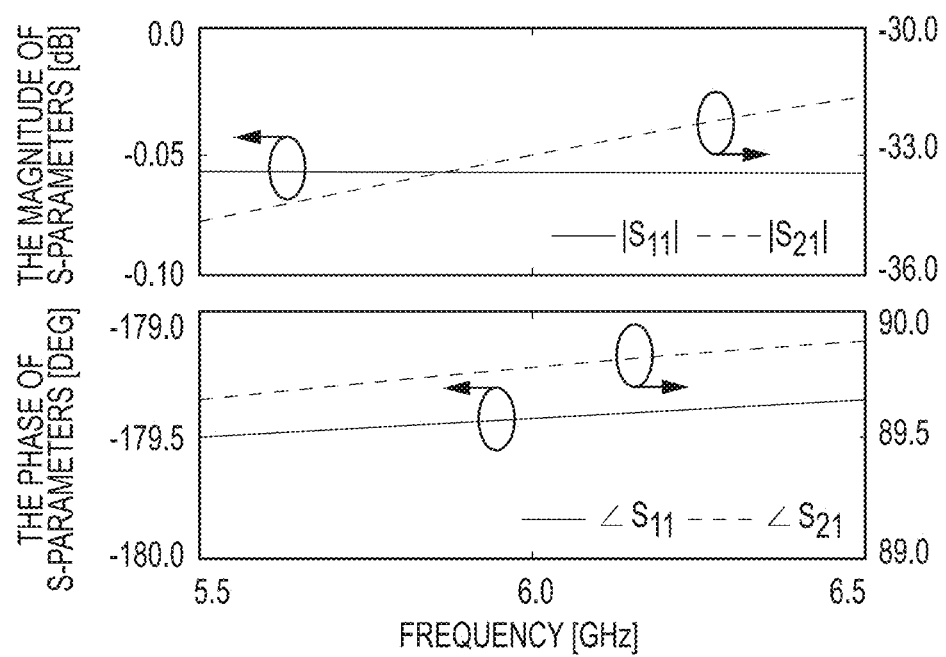
FIG. 13B shows the magnitude (top) and phase (bottom) of S-parameters in accordance with embodiments of the disclosure.

FIG. 13B shows the magnitude (top) and phase (bottom) of S-parameters. As shown, the reference planes are moved to the plane intersecting the center of the post. As illustrated, $|S_{11}|$ is very close to 0 dB, while $|S_{21}|$ is kept below −30 dB (small leakage) over the frequency range. $<S_{21}$ is calculated to be −179°, demonstrating that the posts serve as an electric conducting wall in 5.5-6.5 GHz range.

The disclosure provides a spatial multiplexing system using reconfigurable cavity-backed metasurface antennas generating multiple beams. The channel capacity is demonstrated to be significantly improved in clustered MIMO channels by comparing with a two-element ULA. An example metasurface antenna and its design procedure are provided to demonstrate that the antenna can generate a multitude of steerable beams within the operating bandwidth. While a 2-by-2 MIMO communication system is simulated, the disclosed system can be extended to higher order systems with single-/dual-polarization configuration. In addition, a smaller number of clusters than that typically observed in sub-6 GHz channels is assumed to provide a conceptual development of the system, and the analyses in this work can be applied to the practical channels with many clusters.

Basis Operations

Figure 14:
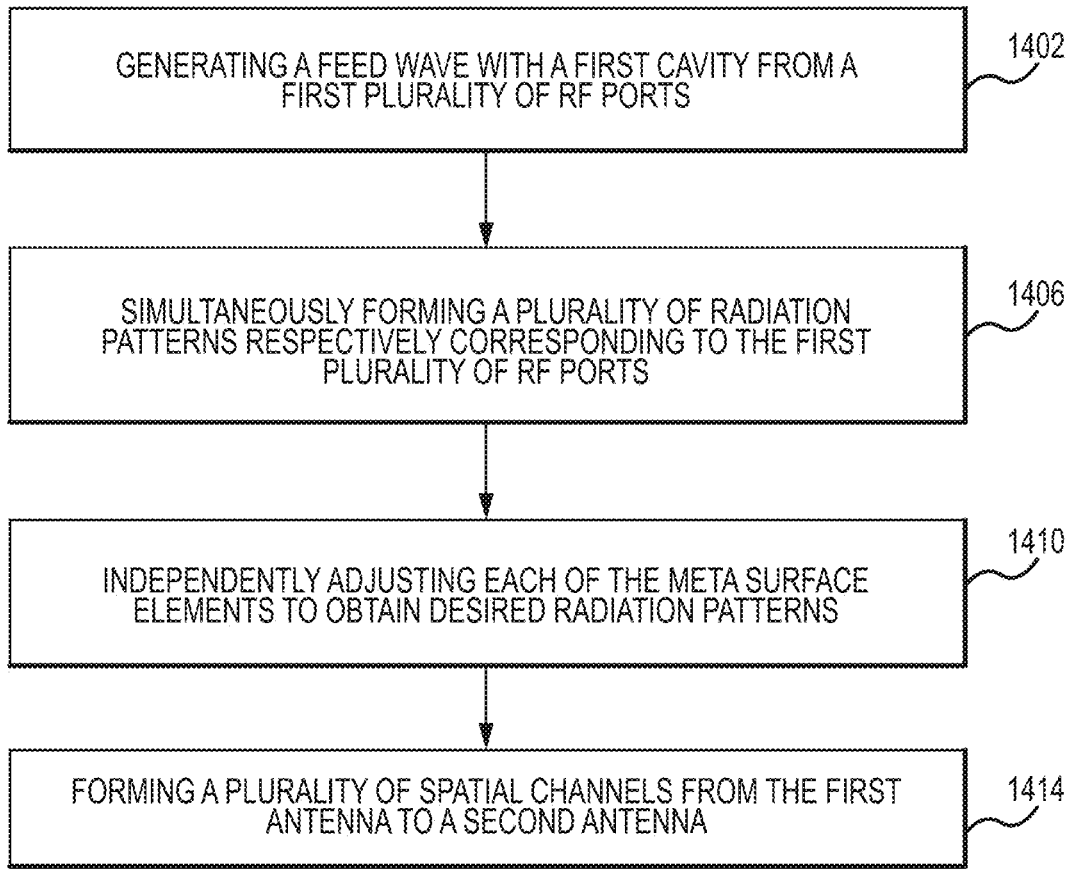
FIG. 14 illustrates the methods for communicating through a MIMO communication system in accordance with embodiments of the disclosure.

The disclosure also provides methods for MIMO communication between first and second antennas. FIG. 14 illustrates the methods for communicating through a MIMO communication system in accordance with embodiments of the disclosure. The method may include generating a feed wave within a first cavity of a first antenna from a first plurality of RF ports at operation 1402. The first cavity may include a first front plate coupled to a first plurality of sub-wavelength artificially structured material elements. The first plurality of RF ports is coupled to the back plate. The method may also include simultaneously forming a plurality of radiation patterns corresponding to the first plurality of RF ports at operation 1406. The method may further include independently adjusting each of the plurality of metasurface elements to obtain desired radiation patterns at operation 1410. The propagation environment between the first antenna and the second antenna may include a plurality of clustered regions. The method may also include forming a plurality of spatial channels from the first antenna to the second antenna to form a communication link at operation 1414. The second antenna may include a second cavity and a second plurality of metasurface elements.

Given the advantages offered by the metasurface antenna, the disclosed system is observed to be a promising spatial multiplexing system for low-power, band-limited small cell networks that require high data rate, low operational cost, and high energy efficiency. It is also worth mentioning that the metasurface antenna with independently reconfigurable wave forms can be used to achieve multiplexing gains in space-division multiple access systems and massive MIMO communication systems.

The techniques described herein, therefore, provide MIMO communication systems for capacity enhancement with cavity-backed metasurface antennas. While there have been shown and described illustrative embodiments that provide for spatial channels between transmitting and receiving antennas in a propagation environment including clustered regions, it is to be understood that various other adaptations and modifications may be made within the spirit and scope of the embodiments herein. For example, the embodiments have been shown and described herein with the specific open cavity system configurations or components. However, the embodiments in their broader sense are not as limited to such configurations or components, and may, in fact, be used with any number of devices and similar configurations, as is appreciated by those skilled in the art. Accordingly, it is appreciated the features, structures, and operations associated with one embodiment may be applicable to or combined with the features, structures, or operations described in conjunction with another embodiment of this disclosure. Additionally, in many instances, well-known structures, materials, or operations are not shown or described in detail to avoid obscuring aspects of this disclosure.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to +0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall in between.

What is claimed is:

1. A MIMO communication system comprising:
a first antenna comprising a first cavity and a first plurality of sub-wavelength artificially structured material elements as arranged on a surface of the first cavity as RF radiators, wherein the first antenna is configured to generate a first plurality of radiation patterns;
a first plurality of RF ports for generating a feed wave within the first cavity; and
a second antenna comprising a second cavity and a second plurality of sub-wavelength artificially structured material elements arranged on a surface of the second cavity, wherein at least one of the first cavity or the second cavity comprises an irregularity including at least one of a tunable impedance boundary or a plurality of conductive cylindrical posts along the surface of the first cavity or the second cavity.

2. The MIMO communication system of claim 1, wherein the first cavity is one of a 2D planar cavity comprising a first front plate that is parallel to a first back plate or a 1D waveguide comprising a tube.

3. The MIMO communication system of claim 2, wherein the first cavity comprises a dielectric material disposed between the first front plate and the first back plate, wherein each of the first plurality of RF ports is coupled to the first back plate.

4. The MIMO communication system of claim 1, wherein the first plurality of RF ports comprises a plurality of coaxial probes coupled to a plurality of radio units, wherein the feed wave inside the first cavity excited by the first plurality of RF ports is a sum of fields from the plurality of coaxial probes.

5. The MIMO communication system of claim 1, wherein the feed wave has an electric field, and wherein a maximum of the electric field is at one RF port, while minimum values or nodes of electric fields are situated at all other RF ports.

6. The MIMO communication system of claim 1, wherein the feed wave is one of an RF wave, a microwave frequency wave, or a mmW frequency wave.

7. The MIMO communication system of claim 1, wherein the feed wave has a bandwidth ranging from 0.5 to 8.0 percent of a central operating frequency.

8. The MIMO communication system of claim 1, further comprising an amplifier and a phase shifter coupled to each of the first plurality of RF ports.

9. The MIMO communication system of claim 1, wherein each of the first plurality of RF ports is configured to be electrically isolated from each other within the first cavity.

10. The MIMO communication system of claim 1, wherein the second antenna is configured to generate a second plurality of radiation patterns, wherein the second antenna is configured to be a transmitting metasurface, wherein the first antenna is configured to be a receiving metasurface.

11. The MIMO communication system of claim 10, wherein each of the first plurality of radiation patterns is superposition of all radiations from the first plurality of sub-wavelength artificially structured material elements, wherein each of the second plurality of radiation patterns is superposition of all radiations from the second plurality of sub-wavelength artificially structured material elements.

12. The MIMO communication system of claim 10, wherein each of the first plurality of radiation patterns or each of the second plurality of radiation patterns comprises a single directed beam.

13. The MIMO communication system of claim 1, wherein the second antenna comprises a second plurality of RF ports.

14. The MIMO communication system of claim 1, wherein each of the first plurality of sub-wavelength artificially structured material elements comprises a metamaterial element, wherein each of the second plurality of sub-wavelength artificially structured material elements comprises a metamaterial element.

15. The MIMO communication system of claim 1, wherein each of the first plurality of sub-wavelength artificially structured material elements is configured to form a magnetic dipole, wherein each of the second plurality of sub-wavelength artificially structured material elements is configured to form a magnetic dipole.

16. The MIMO communication system of claim 1, wherein the first antenna has an aperture size substantially greater than a wavelength corresponding to an operating frequency.

17. The MIMO communication system of claim 1, wherein a spacing between the first plurality of sub-wavelength artificially structured material elements or the spacing between the second plurality of sub-wavelength artificially structured material elements is less than or equal to about one-half of a wavelength corresponding to an operating frequency.

18. A MIMO communication system comprising:
a first antenna comprising a first cavity and a first plurality of sub-wavelength artificially structured material elements as arranged on a surface of the first cavity as RF radiators, wherein the first antenna is configured to generate a first plurality of radiation patterns;
a second antenna comprising a second cavity and a second plurality of sub-wavelength artificially structured material elements arranged on a surface of the second cavity, wherein at least one of the first cavity or the second cavity comprises an irregularity including at least one of a tunable impedance boundary or a plurality of conductive cylindrical posts along the surface of the first cavity or the second cavity; and
active elements coupled to each of the first plurality of sub-wavelength artificially structured material elements and active elements coupled to each of the second plurality of sub-wavelength artificially structured material elements for adjustment of each element.

19. A MIMO communication system comprising:
a first antenna comprising a first cavity and a first plurality of sub-wavelength artificially structured material elements as arranged on a surface of the first cavity as RF radiators, wherein the first antenna is configured to generate a first plurality of radiation patterns; and
a second antenna comprising a second cavity and a second plurality of sub-wavelength artificially structured material elements arranged on a surface of the second cavity, wherein at least one of the first cavity or the second cavity comprises an irregularity including at least one of a tunable impedance boundary or a plurality of conductive cylindrical posts along the surface of the first cavity or the second cavity, and
wherein the second antenna is configured to receive a plurality of scattered radiation patterns from a plurality of clustered regions between the first antenna and the second antenna.

20. A MIMO communication system comprising:
a first antenna comprising a first cavity and a first plurality of sub-wavelength artificially structured material elements as arranged on a surface of the first cavity as RF radiators, wherein the first antenna is configured to generate a first plurality of radiation patterns; and
a second antenna comprising a second cavity and a second plurality of sub-wavelength artificially structured material elements arranged on a surface of the second cavity, wherein at least one of the first cavity or the second cavity comprises an irregularity including at least one of a tunable impedance boundary or a plurality of conductive cylindrical posts along the surface of the first cavity or the second cavity, and
wherein at least one of the first plurality of sub-wavelength artificially structured material elements or the second plurality of sub-wavelength artificially structured material elements is randomly arranged such that a spacing between elements varies irregularly.

\* \* \* \* \*